United States Patent
Cook

(10) Patent No.: US 10,341,217 B2
(45) Date of Patent: Jul. 2, 2019

(54) LOCAL PERFORMANCE TEST DEVICE

(71) Applicant: CentruryLink Intellectual Property LLC, Denver, CO (US)

(72) Inventor: Charles I. Cook, Louisville, CO (US)

(73) Assignee: Centurylink Intellectual Property LLC, Broomfield, CO (US)

( * ) Notice: Subject to any disclaimer, the term of this patent is extended or adjusted under 35 U.S.C. 154(b) by 65 days.

(21) Appl. No.: 15/492,997

(22) Filed: Apr. 20, 2017

(65) Prior Publication Data

US 2017/0310573 A1    Oct. 26, 2017

Related U.S. Application Data

(60) Provisional application No. 62/325,328, filed on Apr. 20, 2016.

(51) Int. Cl.
*H04L 1/00* (2006.01)
*H04L 12/26* (2006.01)

(52) U.S. Cl.
CPC .......... *H04L 43/50* (2013.01); *H04L 43/0882* (2013.01)

(58) Field of Classification Search
CPC .......................... H04L 43/50; H04L 43/0882
USPC ....................................................... 370/242
See application file for complete search history.

(56) References Cited

U.S. PATENT DOCUMENTS

| | | | | |
|---|---|---|---|---|
| 2007/0067132 A1* | 3/2007 | Tziouvaras | ............ | H02H 3/006 702/122 |
| 2009/0138588 A1* | 5/2009 | Qian | ................... | H04L 12/4625 709/224 |
| 2011/0142205 A1* | 6/2011 | Bonnett | ................... | H04M 1/24 379/26.01 |
| 2014/0130111 A1* | 5/2014 | Nulty | ................... | H04N 17/004 725/107 |
| 2015/0019713 A1* | 1/2015 | Bugenhagen | ....... | H04L 43/0811 709/224 |
| 2017/0250869 A1* | 8/2017 | Voellmy | ............... | H04L 41/0893 |
| 2017/0324627 A1* | 11/2017 | Eardley | ................. | H04L 41/142 |
| 2018/0062947 A1* | 3/2018 | Smith | ................. | H04L 41/5067 |

* cited by examiner

*Primary Examiner* — Sai Ming Chan

(57) ABSTRACT

Novel tools and techniques are provided for testing a data connection (e.g., network connection and/or packet-based service connection) and determining a performance condition of the data connection. The data connection may depend on conditions of an access network and/or a local area network. In some embodiments, a local performance test device may be in communication with an access network and/or a local area network. The local performance test device may receive a request to test the access network and/or the local area network. The local performance test device may further be configured to analyze the access network and/or the local area network to determine whether a data connection issue is occurring on the access network and/or the local area network. Once the local performance test device determines where a performance issue is occurring, the local performance test device may send the result of the test to a requesting device.

18 Claims, 13 Drawing Sheets

100

Local Performance Measurement Device

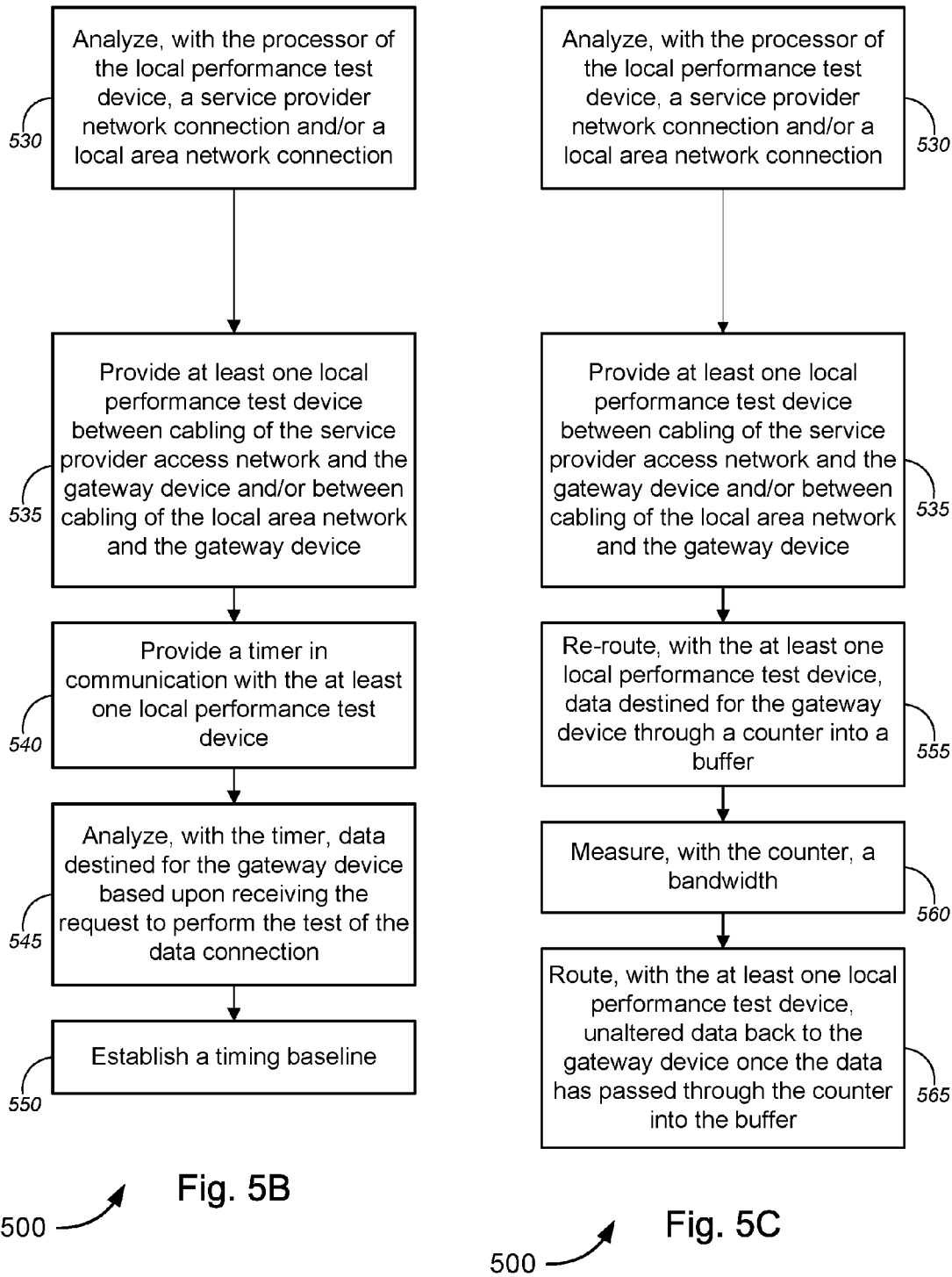

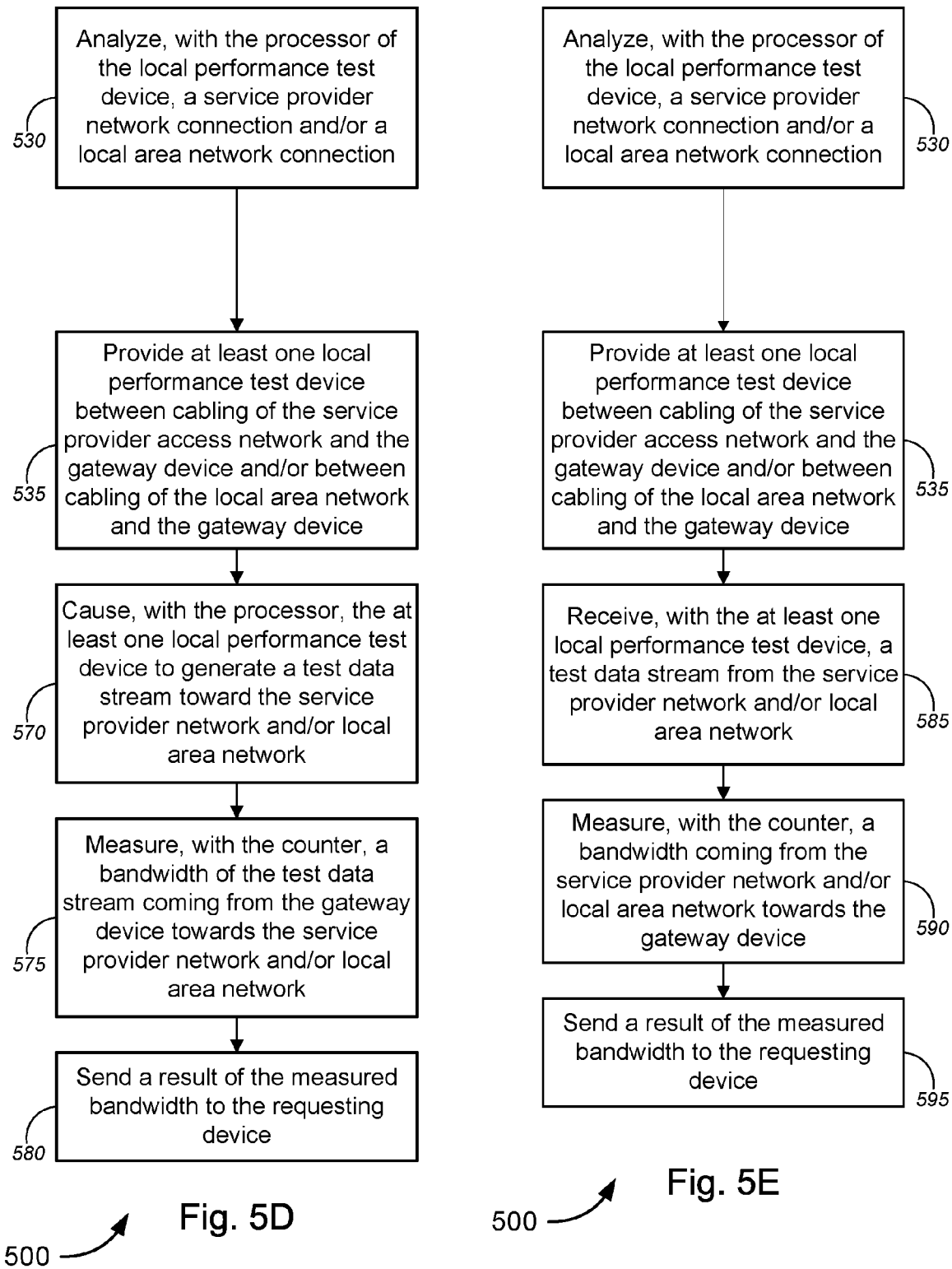

LOCAL PERFORMANCE TEST DEVICE

CROSS-REFERENCES TO RELATED APPLICATIONS

This application claims priority to U.S. Patent Application Ser. No. 62/325,328 (the "'328 application"), filed Apr. 20, 2016 by Charles I. Cook, entitled, "Local Performance Test Device," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for network performance testing, and, in particular embodiments, to methods, systems, apparatus, and computer software for allowing a user to test an access network and/or a local area network to determine whether a performance issue is occurring in an access network and/or a local area network.

BACKGROUND

The performance of a data connection (which might include, without limitation, a network connection, and/or a packet based service connection, or the like) for an end user is typically determined by the performance of a service provider network (and/or an access network) and/or a local area network of an end user.

Traditionally, users that questioned the performance of an end user's network connection relied on a test server hosted in the service provider network or hosted in another network (e.g., the Internet, an access network, a core network, a third party network, and/or the like) to perform test measurements and determine performance of the network. These test servers hosted in the network could return network performance information. However, these test servers hosted in the network could not determine whether a particular performance issue was occurring on a customer's local area network, a device communicatively coupled to the local area network, an access network or some other network, or a node in one or more of such networks. Thus, a user could not determine which data or network connection (i.e., a customer's local area network, an access network, a service provider network, a third party network, a packet-based service network, and/or the like) needed to be improved and/or repaired.

Hence, there is a need for more robust and scalable solutions for testing an access network and/or a local area network, and for allowing a user to test an access network and/or a local area network to determine whether a performance issue is occurring in an access network and/or a local area network.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5E are flow diagrams illustrating a method for implementing local performance testing, in accordance with various embodiments.

DETAILED DESCRIPTION OF CERTAIN EMBODIMENTS

Overview

Figure 1:
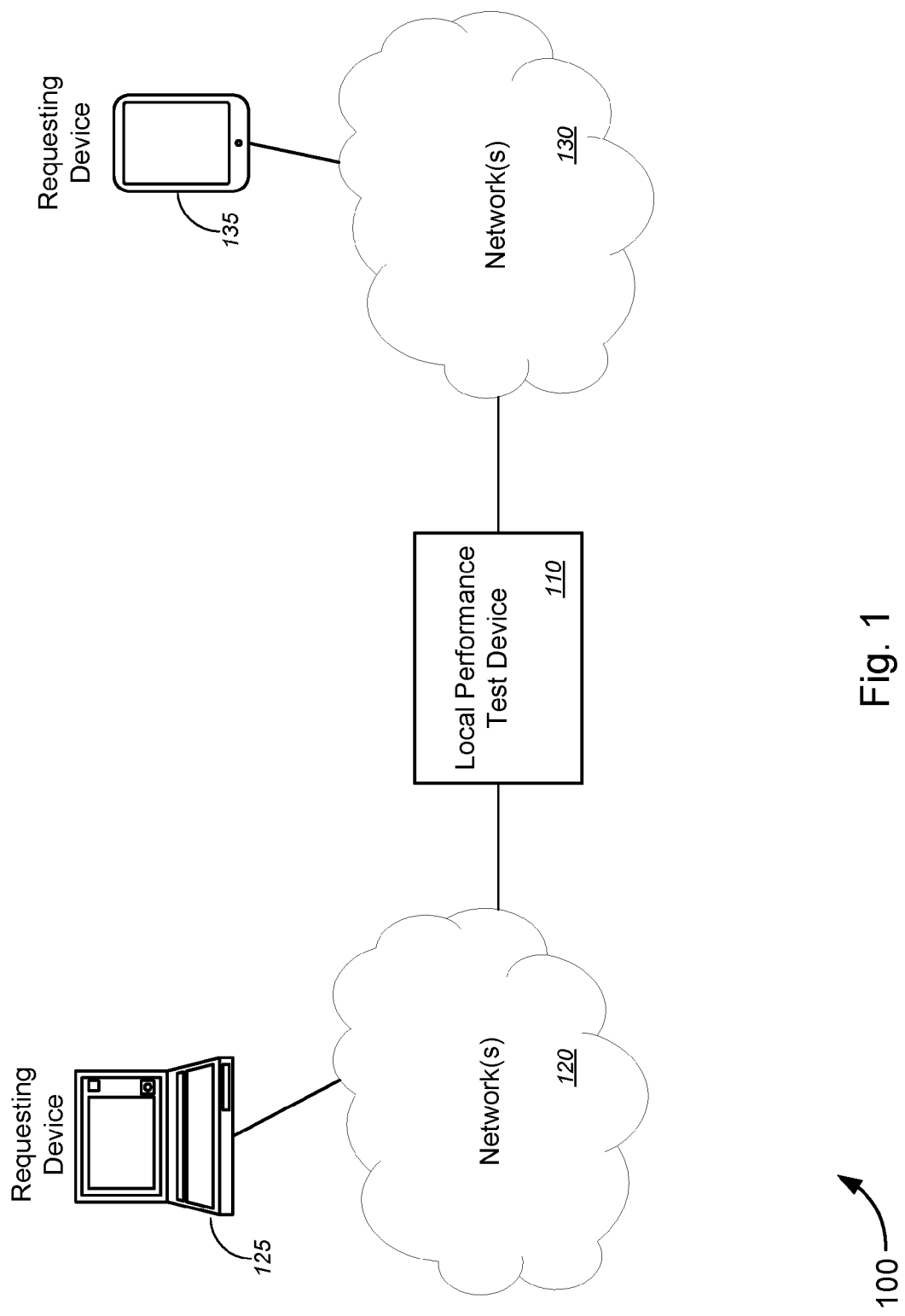
FIG. 1 is a schematic diagram illustrating a system for implementing local performance testing using a local performance test device, in accordance with various embodiments.

Various embodiments provide improved techniques for testing a service provider network and/or a local area network, including, without limitation, solutions that can be used for allowing a user, customer, network provider, content provider, and/or service provider to test a service provider network and/or a local area network to determine whether a performance issue is occurring in the service provider network and/or the local area network.

In a particular aspect of some embodiments, a local performance test device might be configured to be in communication with at least one of an access network (which is a service provider network) and/or a local area network. The local performance test device may be used to test the performance of the access network and/or the local area network, and to determine a performance condition or status of the access network and/or the local area network. Based on a determination of the performance condition or the status of the access network and/or the local area network, the local performance test device may determine whether a performance problem is occurring on the access network (or some other external network in communication with the access network) and/or the local area network.

The local performance test device may then notify a user (such as an end-user of a data connection, a network connection, and/or a packet based service, and/or a service provider or its agents or representatives, etc.) that a problem is occurring on the access network (or other external network) and/or the local area network, based on such determination. By notifying a user about where a data connection problem is occurring, a service provider and/or an end-user can effectively address and repair (or request repair of) the network connection (or identified portion of the network(s)) that is experiencing the performance issue.

Herein, "external network" might refer to any network external to the local area network or the customer premises in (or around) which the local area network is located, and might include, without limitation, an access network, a service provider core network, a third party network, a packet-based service network, and/or the like. Herein, "data connection" might refer to a network connection, a packet-based service connection, and/or the like, and "data connection problem" or "data connection issue" might refer to connectivity issues with the data connection including, but not limited to, dropped connection, slow connection, packet loss, frame loss, bandwidth issues, latency issues, jitter issues, delay, throughput issues, and/or the like.

Users who have knowledge of the performance of their data connection (e.g., Internet connection, broadband service connection, service provider network connection, local area network connection, packet-based service connection, and/or the like) are better equipped to understand the capabilities and limitations of their data connection (which might include, without limitation, a network connection, a packet based service connection, and/or the like). Such users can use that information to determine, for example, where a data connection problem is occurring (i.e., whether the problem is occurring on a service provider network, an access network, a local area network, a service provider network connection, a local area network connection, a device(s) communicatively coupled to the service provider network and/or local area network, a node(s) in the service provider network and/or local area network, or the like); where repairs to a data connection need to be made (e.g., in a service provider network, an access network, a local area network, a service provider network connection, a local area network connection, a device(s) communicatively coupled to the service provider network and/or local area network, a node(s) in the service provider network and/or local area network, or the like); what types of repairs need to be made; what applications can reasonably run; when it may be time to upgrade equipment in one or more networks and/or user devices; and/or the like. Further, service providers that provide tools to determine whether a problem is occurring on an access network and/or a local area network may experience increased customer satisfaction as a result. In various embodiments, a method, system, and/or apparatus may be provided for testing a data connection (including, but not limited to, a network connection, a packet based service, and/or the like) and/or determining the performance characteristics of the data connection.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network configuration technology, network testing technology, user-based network monitoring technologies, and/or the like. In other aspects, certain embodiments can improve the functioning of user equipment or systems for monitoring and/or testing network equipment (e.g., user monitoring devices, user testing devices, etc.). For example, by analyzing network traffic obtained by a local performance test device, a user can determine whether a performance issue is occurring on a customer's local area network, an access network, and/or the like. In particular, to the extent any abstract concepts are present in the various embodiments, those concepts can be implemented as described herein by devices, software, systems, and methods that involve specific novel functionality (e.g., steps or operations), such as analyzing network traffic from the local performance test device to determine whether a performance issue is occurring on a customer's local area network, an access network, another external network, and/or the like, and determining whether or not to send the performance information to at least one of the devices associated with a user (such as a customer, a network provider, a content provider, a service provider, a third-party, and/or the like), that improves the functionality of the local area networks, access networks, and/or the like by providing information obtained by the local performance test device about where a performance issue is occurring. These functionalities extend beyond mere conventional computer processing operations. These functionalities can produce tangible results outside of the implementing computer system, including, merely by way of example, improved functionality of networks and/or the like, at least some of which may be observed or measured by customers and/or service providers.

Merely by way of example, a method for testing a data connection (which might include, without limitation, a network connection, and/or a packet based service connection, and/or the like) in accordance with one set of embodiments might comprise receiving, with a processor of a local performance test device and from a requesting device, a request to perform a test, with a test measurement function of the local performance test device, to determine a source of a data connection issue. The local performance test device may be in communication with a service provider network and/or a local area network of a user premises.

A further aspect of the method may comprise analyzing, with the processor of the local performance test device, a service provider network connection of the service provider network. The processor may determine a condition on the service provider network such as bandwidth, packet loss, frame loss, data rate and/or speed, throughput, jitter, delay, and/or the like. Additionally and/or alternatively, the method may comprise analyzing, with the processor of the local performance test device, a local area network connection of the local area network. The processor may determine a condition on the local area network such as bandwidth, packet loss, frame loss, data rate and/or speed, throughput, jitter, delay, and/or the like.

Once the conditions on the service provider network and/or the local area network are determined and/or analyzed, the method may further comprise determining, with the processor of the local performance test device, whether the data connection issue is associated with the service provider network connection and/or the local area network connection. Once this determination is made, a result may be sent to the requesting user.

The local performance test device and/or test measurement function of local performance test device may be integrated into and/or separate from (but in communication with) a network device comprising at least one of a digital subscriber line modem, a passive optical network optical network terminal, a wireless modem, a gateway device, and/or the like. The gateway device may be a residential gateway and/or a commercial gateway. Merely by way of example, if the local performance test device is integrated into the gateway device, the test function may be located between the access network port and the gateway electronics and/or between the local area port and the gateway electronics.

The service provider network and/or local area network may comprise an Ethernet network.

Merely by way of example, a method may further comprise providing the local performance test device in communication with the service provider network. The local performance test device may be configured to perform a test measurement function of a network traffic that is transmitted to the service provider network and/or received from the service provider network.

The local performance test device may be in communication with at least one of an access network. The local performance test device may be placed between cabling of a service provider network and cabling for a digital subscriber line modem, a passive optical network optical network terminal, a wireless modem, a network node, a network router, a network switch, a gateway device, and/or the like.

The local performance test device may further be configured to terminate the physical layer of the service provider network by placing the local performance test device between cabling for the service provider network and cabling for a gateway device (i.e. residential gateway, business gateway, and/or the like). The test function of the local performance test device may also be integrated into a modem (or equivalent device that terminates the network access technology).

One way to determine and/or analyze a state of the access network connection, the method may further comprise providing a timer in communication with the at least one local performance test device, analyzing, with the timer, network traffic destined for the gateway device based upon receiving the request to perform the test of the data connection (which might include, without limitation, a network connection, and/or a packet based service connection, and/or the like), and establishing a timing baseline. Using the timing baseline, conditions such as data rate and/or speed, throughput, jitter, delay, latency and/or the like of the service provider network may be determined.

A further aspect of analyzing a service provider network connection may comprise re-routing, with the local performance test device, network traffic destined for at least one of a digital subscriber line modem, a passive optical network optical network terminal, a network node, a network router, a network switch, a wireless modem, a gateway device, and/or the like through a counter into a buffer. The counter may then measure a bandwidth of the transmitted network traffic. After measuring the network traffic, the local performance test device may route unaltered network traffic back through at least one of a digital subscriber line modem, a passive optical network optical network terminal, a network node, a network router, a network switch, a wireless modem, a gateway device, and/or the like. The counter may further be used to measure packet loss and/or frame loss that is occurring in the service provider network.

In order to test an access network connection, existing network traffic that is being transmitted through the access network and/or local area network may be tested by a test measurement function of the local performance test device. Additionally and/or alternatively, the processor of the local performance test device may cause the local performance test device to generate new test network traffic to send toward the service provider network. The local performance test device may then test the new test network traffic as it is being transmitted toward the service provider network. Further, a device on the access network may be used to generate test network traffic that is transmitted towards the test measurement function of the local performance test device. The test measurement function of the local performance test device may then test the new test network traffic as it is being transmitted toward the test measurement function.

Additionally and/or alternatively, the local performance test device may be in communication with at least one of a local area network and/or local performance test device. The at least one local performance test device may be configured to perform a test measurement function of network traffic that is transmitted to the local area network and/or received from the local area network.

The at least one local performance test device may be in communication with at least one of a local area network. The at least one local performance test device may be placed between cabling of a local area network and cabling for a digital subscriber line modem, a passive optical network optical network terminal, a network node, a network router, a network switch, a wireless modem, a gateway device, and/or the like.

The at least one local performance test device may terminate the physical layer of the local area network by placing the local performance test device between cabling for the local area network and cabling for a local a gateway device (i.e., a residential gateway, a business gateway, and/or the like). The test function of the local performance test device may also be integrated into a local area network device that terminates the physical layer of the local area network such as wireless access point. In the case of the wireless access point, the test measurement function may be located between the wide area network side port and the Wi-Fi transceiver.

In order to determine a state of the local area network connection, the method may further comprise providing a timer in communication with the local performance test device, analyzing, with the timer, network traffic destined for the gateway device based upon receiving the request to perform the test of the data connection (which might include, without limitation, a network connection, and/or a packet based service connection, and/or the like), and establishing a timing baseline. Using the timing baseline, conditions such as data rate and/or speed, throughput, jitter, delay, and/or the like of the local area network may be determined.

A further aspect of analyzing a local area network connection may comprise re-routing, with the local performance test device, network traffic destined for at least one of a digital subscriber line modem, a passive optical network optical network terminal, a network node, a network router, a network switch, a wireless modem, a gateway device, and/or the like through a counter into a buffer. The counter may then measure a bandwidth of the re-routed network traffic. After measuring the re-routed network traffic, the local performance test device may route unaltered network traffic back through at least one of a digital subscriber line modem, a passive optical network optical network terminal, a network node, a network router, a network switch, a wireless modem, a gateway device, and/or the like. The counter may further be used to measure packet loss and/or frame loss that is occurring in the local area network.

In order to test a local area network connection, existing network traffic that is being transmitted through the access network and/or local area network may be tested by a test measurement function of the local performance test device. Additionally and/or alternatively, the processor of the local performance test device may cause the at least one local performance test device to generate new test network traffic to send toward the local area network. The local performance test device may then test the new test network traffic as it is being transmitted toward the local area network. Further, a device on the local area network may be used to generate test network traffic that is transmitted towards the test measurement function of the local performance test device. The test measurement function of the local performance test device may then test the new test network traffic as it is being transmitted toward the test measurement function.

The request to test the data connection (which might include, without limitation, a network connection, and/or a packet based service connection, and/or the like) may be received from a user such as an end-user, a customer, a network provider, a service provider, a content provider, a third-party, and/or the like.

Another aspect according to certain embodiments provides a system for testing a data connection (which might include, without limitation, a network connection, and/or a packet based service connection, and/or the like). The system may comprise a local performance test device in communication with a service provider network and a local area network. The local performance test device may comprise at least one first processor and a first non-transitory computer readable medium communicatively coupled to the at least one first processor.

The local performance test device may be used to analyze the network traffic as a whole (i.e., all the network traffic may be analyzed as it is carrying multiple traffic flows such as Voice over Internet Protocol (VoIP), Internet, unicast video streaming, multicast video, teleconferencing, data streaming, financial data streaming, or the like simultaneously). Additionally, and/or alternatively, using Deep Packet Inspection (DPI), the local performance test device 110 may analyze specific or multiple specific traffic flows such as voice, video, and/or data flows. The local performance test device may further be used to analyze network services such as a VoIP connection, a data connection, a network connection, a packet based service connection, a unicast video streaming connection, a multicast video connection, a teleconferencing connection, a financial network data streaming connection, or the like. DPI allows the local performance test device 110 to recognize types of packets such as VoIP packets, Internet packets, unicast video streaming packets, multicast video packets, teleconferencing packets, data streaming, financial data streaming packets, or the like and then test each specific network traffic flow.

Additionally, the local performance test device may analyze specific network flows from the network traffic such as data flows, voice flows, and/or video flows.

In some cases, the first non-transitory computer readable medium may have stored thereon computer software comprising a first set of instructions that, when executed by the at least one first processor, may cause the local performance test device to: (1) receive, from a requesting device, a request to perform a test to determine a source of a data connection issue, wherein the local performance test device is in communication with the service provider network and the local area network of a user premises; (2) analyze a service provider network connection of the service provider network; (3) analyze a local area network connection of the local area network; (4) determine whether the data connection issue is associated with the service provider network connection or with the local area network connection; and (5) send a result of the determination to the requesting device.

The local performance test device and/or test measurement function of local performance test device may be integrated into and/or separate from (but in communication with) a network device comprising at least one of a digital subscriber line modem, a passive optical network optical network terminal, a network node, a network router, a network switch, a wireless modem, a gateway device, and/or the like. The gateway device may be a residential gateway and/or a commercial gateway. Merely by way of example, if the local performance test device is integrated into the gateway device, the test function may be located between the access network port and the gateway electronics and/or between the local area port and the gateway electronics.

The service provider network and/or local area network may each comprise an Ethernet network.

The system may further comprise a first test measurement function and a second test measurement function. The first test measurement function may be in communication with the service provider network between cabling of the service provider network and the gateway device. The second test measurement function may be in communication with the local area network between cabling of the local area network and the gateway device.

Merely by way of example, another aspect according to certain embodiments may be an apparatus for testing a data connection (which might include, without limitation, a network connection, and/or a packet based service connection, and/or the like). The apparatus might comprise at least one processor and a non-transitory computer readable medium communicatively coupled to the at least one processor, the non-transitory computer readable medium having stored thereon computer software comprising a set of instructions. In some cases, the set of instructions, when executed by the at least one processor, may cause the apparatus to: (1) receive, from a requesting device, a request to perform a test to determine a source of a data connection issue, wherein the local performance test device is in communication with the service provider network and the local area network of a user premises; (2) analyze a service provider network connection of the service provider network; (3) analyze a local area network connection of the local area network; (4) determine whether the data connection issue is associated with the service provider network connection or with the local area network connection; and (5) send a result of the determination to the requesting device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of a method, system, and/or apparatus for testing a service provider network (e.g., an access network, a device communicatively coupled to the service provider network, a node(s) in the service provider network, or the like) and/or a local area network (e.g., a customer network, a wireless local area network, a device(s) communicatively coupled to the local area network, a node(s) in the local area network, or the like), and for allowing a user, customer, network provider, content provider, and/or service provider to test the service provider network and/or the local area network to determine whether a network performance issue is occurring in the service provider network and/or the local area network. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing local performance testing using a local performance test device 110, in accordance with various embodiments. In the non-limiting embodiment of FIG. 1, system 100 might include, without limitation, a local performance test device 110, a service provider network(s) 120 (e.g., an access network(s), a core network(s), a device(s) communicatively coupled to the service provider network, a node(s) in the service provider network, or the like), a local area network(s) 130 (e.g., a customer network, a wireless local area network, a device(s) communicatively coupled to the local area network, a node(s) in the local area network and/or the like) associated with a user, and requesting devices 125 and 135 that are respectively associated with a service provider associated with the service provider network(s) 120 and associated with the user. While certain functional components of system 100 are illustrated by FIG. 1, the system 100 might have a networked system of components such as computers, computing systems, and/or system hardware architecture, as described below with respect to FIG. 7.

The local performance test device 110, in some embodiments, might be located at a customer premises or might otherwise be associated with a user (yet may not be restricted to being located at the customer premises). The customer premises might, in some instances, include, without limitation, a residential premises, a business premises, a multi-dwelling premises, a unit within a multi-dwelling premises, industrial premises, commercial offices, government facility, public facility, and/or the like. The local performance testing device may also be placed somewhere in the service provider network (e.g., communicatively coupled to an access network(s), a core network(s), a device(s) communicatively coupled to the service provider network, a node(s) in the service provider network, or the like).

A purpose of the local performance test device 110 is to test a data connection, a packet based service connection, an Internet connection, a network(s), a network connection(s), a device(s) communicatively coupled to a network(s), a content provider server, a node(s) in a network, or the like to determine where a performance issue may be occurring. The local performance test device 110 may incorporate a test measurement function to test the data connection, the packet based service connection, the Internet connection, the network(s), the network connection(s), the device(s) communicatively coupled to the network(s), the content provider server, the node(s) in the network, and/or the like.

In a non-limiting example, local performance test device 110 may be used to analyze network traffic to test the service provider network(s) 120 (e.g., an access network(s), a core network(s), a service provider network connection(s), a device(s) communicatively coupled to a service provider network(s), a content provider server, a node(s) in a service provider network, or the like) and/or the local area network(s) 130 (e.g., a customer network, a wireless local area network, a device(s) communicatively coupled to the local area network, a node(s) in the local area network and/or the like) to determine if a performance issue is occurring on the service provider network(s) 120 and/or on the local area network(s) 130. The network traffic may be analyzed by the local performance test device as the network traffic is travelling towards and/or away from network(s) 120 and/or 130.

The local performance test device 110 may be used to analyze the network traffic as a whole (i.e., all the network traffic may be analyzed as it is carrying multiple services such as Voice over Internet Protocol (VoIP), Internet, unicast video streaming, multicast video, teleconferencing, data streaming, financial data streaming, or the like simultaneously). Additionally, and/or alternatively, using Deep Packet Inspection (DPI), the local performance test device 110 may analyze specific or multiple specific traffic flows such as a VoIP connection, an Internet connection, a unicast video streaming connection, a multicast video connection, a teleconferencing connection, a financial network data streaming connection, or the like. DPI allows the local performance test device 110 to recognize types of packets such as VoIP packets, Internet packets, unicast video streaming packets, multicast video packets, teleconferencing packets, data streaming, financial data streaming packets, or the like and then to test each specific network traffic flow.

By analyzing specific traffic flows, the local performance test device can isolate and determine specific and/or individual traffic flows that are causing performance issues, and can notify a requesting device or user which traffic flows are causing performance issues. Thus, a user may be able to determine whether a VoIP connection, an Internet connection, a unicast video streaming connection, a multicast video connection, a teleconferencing connection, a financial network data streaming connection, or the like is causing performance issues.

The local performance test device 110 may be used to test a variety of conditions on the network(s) 120 and 130. For example, the performance test device 110 may be used to measure bandwidth, packet loss, frame loss, jitter, delay, latency, data rate and/or speed, throughput, and/or the like.

In order to test the network(s) 120 and/or 130, the local performance test device 110 must be in communication with the network(s) 120 and/or 130. The local performance test device 110 and/or test measurement function of the local performance test device 110 either can be integrated into a network device that is in communication with at least two networks (e.g., the access network(s) 120 and/or the local area network(s) 130) or can be a standalone (or separate) add-on device. The network access device may be associated with the customer premises. Alternatively, or additionally, the network device may be owned by the customer or by the network provider. In some cases, the network access device could be at least one of a digital subscriber line modem, a passive optical network optical network terminal, a network node, a network router, a network switch, a wireless modem, a gateway device, and/or the like. As a standalone (or separate) add-on device, the local performance test device 110 could be at least one of a digital subscriber line modem, a passive optical network optical network terminal, a network node, a network router, a network switch, a wireless modem, a gateway device, and/or the like.

If the local performance test device 110 is integrated into a gateway device, the gateway device may be a residential gateway device or a business gateway device. Merely by way of example, if the local performance test device is integrated into the gateway device, the test function may be located between the access network port and the gateway electronics and/or between the local area port and the gateway electronics.

If the local performance test device 110 is a gateway device or integrated into a gateway device, the local performance test device 110 may also be used to determine the network performance characteristics between a digital subscriber line modem, a passive optical network optical network terminal, a wireless modem, and/or a router and the local area network(s) 130. Thus, the local performance test device 110 may be able to determine whether a data connection problem is occurring in a digital subscriber line modem, a passive optical network optical network terminal, a wireless modem, and/or a router, or in the local area network(s) 130, or both. Further, if the gateway has a wireless access point, then the local performance test device 110 and/or a test measurement function of the local performance test device 110 may be inserted between the gateway and the wireless access point. Thus, the local performance test device 110 may be able to determine whether a data connection problem is occurring because of the gateway and/or the wireless access point.

Additionally and/or alternatively, performance measurement capabilities can be included in wireless client devices to provide an indication of the performance of the wireless link. The test function of the local performance test device may also be integrated into a local area network device that terminates the physical layer of the local area network such as wireless access point. In the case of the wireless access point, the test measurement function may be located between the wide area network side port and the Wi-Fi transceiver.

The local performance test device 110 may also be used to determine whether an issue is occurring in a device(s) (e.g., a tablet computer, a smart phone, a mobile phone, a personal digital assistant, a desktop computer, a television, a set-top box, a gaming console, a portable gaming device, a printer, a human interface device, or the like) communicatively coupled to network(s) 120 and/or 130 or communicatively coupled to a node in network(s) 120 and/or 130. In order to determine whether an issue is occurring in a device(s) communicatively coupled to a network(s) 120 and/or 130 or to a node in network(s) 120 and/or 130, the device(s) and/or nodes may be directly and/or communicatively coupled to local performance device 110. If the device(s) and/or node(s) are directly coupled to the local performance test device, a user can determine whether the device(s) and/or node(s) are the cause of the data connection problem or if it is another device on the network(s) 120 and/or 130 that is affecting the data service.

The local performance test device 110 may further be used to test a content provider's server. In order to determine whether an issue is occurring in a content provider's server coupled to a network(s) 120 and/or 130, the content provider server may be directly and/or communicatively coupled to local performance device 110, provided that the content provider has so equipped their server with a local performance device 110 that responds to requests to test the customer provider server.

In order to test the service provider network(s) 120 (e.g., access network(s), core network(s), or the like) and/or the local area network(s) 130, the local performance test device 110 may be in communication with at least one service provider network 120 and/or at least one local area network 130 such that the local performance test device can see network traffic on the at least one service provider network 120 and/or the at least one local area network 130. The local performance test device 110 may be configured such that a communication path that communicatively couples the service provider network(s) 120 to the local area network(s) 130 extends through the local performance test device 110 and/or a test measurement function of the local performance test device 110. The communication path can either be external, or take advantage of the existing communication path that the device (passive optical network ("PON") optical network terminal ("ONT"), wireless modem, router, gateway device, and/or the like) inherently has. In some embodiments, the local performance test device 110 and/or network device might serve as a demarcation point between the local area network 130 at the customer premises and the service provider network 120 (e.g., access network(s), core network(s), or the like).

The local performance test device 110 may have a first test measurement function communicatively coupled to a network(s) 120 side of the device and a second test measurement function communicatively coupled to a local area network(s) 130 side of the device. The test measurement function can be external to, or integrated within, the local performance test device 110. If test measurement function is external, connections can be made via an electrical or optical coupler depending on the type of ports on the local performance test device 110.

According to some embodiments, the service provider network(s) 120 and/or local area network(s) 130 might each include, without limitation, one of a fiber network, an Ethernet network, a Token-Ring™ network, a wide-area network ("WAN"), a wireless wide area network ("WWAN"), a fixed wireless network, a mobile wireless network, a passive optical network ("PON"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 120 might include an access network of the service provider (e.g., an Internet service provider ("ISP")), or the like.

Further, local performance test device 110 may be configured to perform tests periodically (e.g., hourly, daily, weekly, monthly, or the like). A user may interact directly with local performance testing device 110 to configure a test of the data connection (which might include, without limitation, a network connection, and/or a packet based service connection, and/or the like), and/or the local performance test device 110 may be configured to receive input from at least one requesting device 125 and/or 135 to perform a test of the data connection (which might include, without limitation, a network connection, and/or a packet based service connection, and/or the like). If the test measurement function is performed periodically, the test measurement results may be performed at the same time of day, or periodically throughout the day, to compare measurement results and to determine whether the results are consistent. Additionally, a user may configure a test by interacting with a button or other user interface device located on local performance test device 110 (or interact with a user device in wireless or wired communication with the local performance test device 110, or the like).

If the test measurement function is configured based on a request from at least one requesting device 125 and/or 135, the at least one requesting device 125 and/or 135 may request that the local performance test device 110 perform a test to determine a network condition on network(s) 120 and/or and network(s) 130. The at least one requesting device 125 and/or 135 may be associated with a customer, an end-user of a data connection, a network connection, a packet based service connection, a network provider, a service provider, a content provider, a third-party, and/or the like. The at least one requesting device 125 and/or 135 may be at least one of a tablet computer, a smart phone, a mobile phone, a personal digital assistant, a desktop computer, a television, a set-top box, a gaming console, a portable gaming device, a human interface device (such as an Internet of things human interface device as described in detail in U.S. patent application Ser. No. 15/370,764 (the "'764 application"), filed Dec. 6, 2016 by Thomas C. Barnett, Jr. and titled, "Internet of Things (IoT) Human Interface Apparatus, System, and Method", which is incorporated herein by reference in its entirety for all purposes), and/or the like. The at least one requesting device 125 and/or 135 may be configured to communicate with the local performance test device 110 via a wired and/or wireless connection.

The at least one requesting device 125 and/or 135 could configure the local performance test device 110 through a command line interface, a graphical user interface, a micro-web browser interface, and/or the like. The local performance test device 110 may authenticate a requesting device 125 and/or 135 before performing a test of the data connection (which might include, without limitation, a network connection, and/or a packet based service connection, and/or the like). For example, the requesting device 125 and/or 135 may be required to provide a password, customer number, IP address, and/or the like before the performance device 110 configures the test measurement function to test a network connection. The local performance test device 110 may also be pre-configured to perform certain measurements and to send the test results to the requesting device 125 and/or 135. A requestor may also use a web browser and/or requesting device 125 and/or 135 to access the test results from the local performance test device 110.

The preconfigured local performance test device 110 may also automatically send the test results to a server in the network and/or to a web browser. The server may provide a portal that a requestor can access to retrieve the results. The portal can provide authorization and/or authentication services for access to the data, assuming the connection to the network 120 is working. For example, the portal of the server could require that the requestor input a password, customer number, IP address, and/or the like to access the test results from the local performance test device 110.

Uploading the test results to a web browser would allow the end customer to retrieve performance data/history even if the network connection is down. The web browser may also provide authorization and authentication services for access to the data. For example, the web browser could require that the requestor input a password, customer number, IP address, and/or the like to access the test results from the local performance test device 110.

At least some of these and other functions of the system 100 (and its components) are described in greater detail below with respect to FIGS. 2-4.

Figure 2:
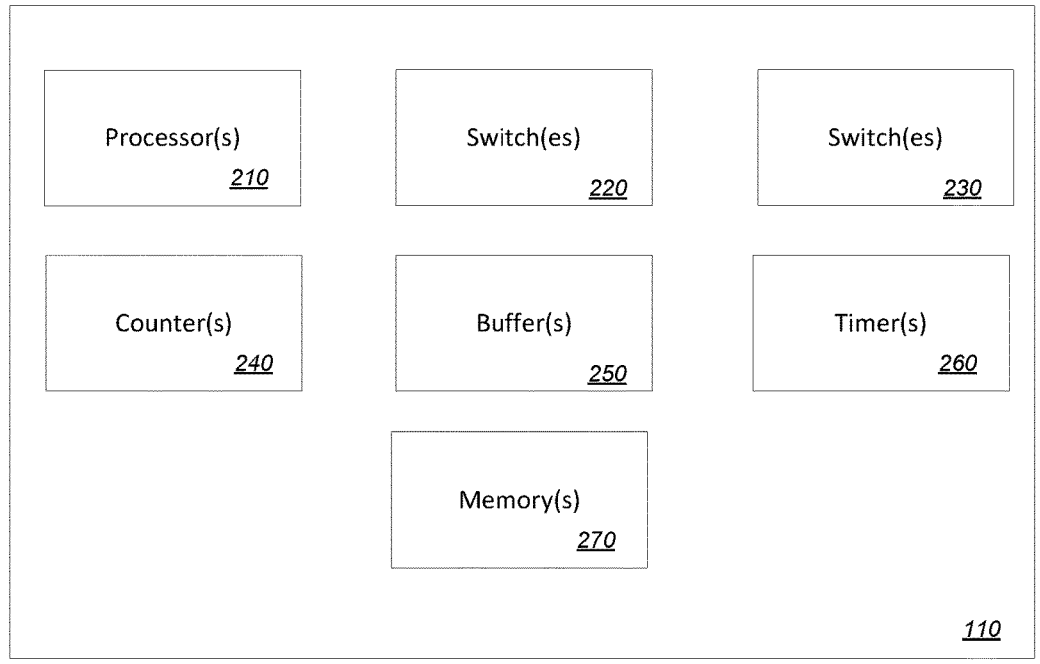
FIG. 2 is a schematic block diagram illustrating a local performance test device, in accordance with various embodiments.

FIG. 2 is a schematic block diagram illustrating a local performance test or measurement device 110, in accordance with various embodiments. The various components of local performance test device 110 of FIG. 1 may be incorporated within a single housing that encloses the entirety of the local performance test device 110, including, but not limited to, one or more processors 210, one or more switches 220 and 230, one or more counters (and/or other test function(s)) 240, one or more buffers 250, one or more timers 260, and/or one or more memories or memory devices 270. However, certain structural components of the local performance test device 110 may be relatively more integrated or relatively separated, as appropriate or as desired. Thus, the local performance test device 110 depicted by FIG. 2 should be considered a set of functional components, which may or may not correspond to individual structures. Moreover, while certain functional components of an exemplary local performance test device 110 are illustrated by FIG. 2, the local performance test device 110 might have one or more components of a general purpose computer system, as described below with respect to FIG. 7.

The processors 210 may be in communication with at least one of one or more switches 220 and 230, one or more counters (and/or other test function(s)) 240, one or more buffers 250, one or more timers 260, and/or one or more memories or memory devices 270. A computer readable medium (which might be part of the one or more memory devices 270 or separate from the one or more memory devices 270) may be in communication with the one or more processors 210.

Processor(s) 210 may be configured to direct the test measurement function to test the network connection periodically (e.g., hourly, daily, weekly, monthly, or the like). Processor(s) 210 may be configured to receive input from a user requesting that a test of the network or data connection (e.g., Internet connection, service provider network, packet-based network connection, local area network connection, or the like) be performed. This user input may be from interaction through a button and/or sensor communicatively coupled to processor(s) 210 and/or through a requesting user device communicative coupled to processor(s) 210. After receiving the user input, the processor(s) 210 may direct the test measurement function of the local performance test device 110 to test the network or data connection.

Local performance test device 110 may be used to test network traffic (e.g., network traffic as a whole, specific network traffic, or multiple specific traffic flows) as it is transmitted towards and/or from local performance test device 110. In order to test network traffic as it is transmitted from local performance test device 110 to network(s) 120 and/or 130, local performance test device 110 may test existing network traffic that is being transmitted from/to network(s) 120 to/from network(s) 130. The existing network traffic may be generated by an end-user device connected to network(s) 120 and/or 130. Processor(s) 210 may additionally configure the local performance test device 110 to generate a test stream of network traffic towards the network(s) 120 and/or network(s) 130. The generated test stream of network traffic, in some embodiments, may be generated by processor(s) 210 specifically for the purpose of measurement and testing. The end-user device(s), local performance test device 110, and/or processors 210 could be a generator of random characters. The end-user device(s), local performance test device 110, and/or processors 210 could further be configured to generate a particular pattern(s) or sequence(s) that may facilitate the identification of lost packets or facilitate the counting of packets. The end-user device(s), local performance test device 110, and/or processors 210 may also vary the size of the packets to help determine whether a network(s), network connection, user device, server, and/or node is performance sensitive to packet size or to test whether the network supports Jumbo frames (e.g., MTU size of 9000).

The local performance test device 110 may be used to analyze the network traffic as a whole (i.e., all the network traffic may be analyzed as it is carrying multiple services such as Voice over Internet Protocol (VoIP), Internet, unicast video streaming, multicast video, teleconferencing, data streaming, financial data streaming, or the like simultaneously). Additionally, and/or alternatively, using Deep Packet Inspection (DPI), the local performance test device 110 may analyze specific or multiple specific traffic flows such as a VoIP connection, an Internet connection, a unicast video streaming connection, a multicast video connection, a teleconferencing connection, a financial network data streaming connection, or the like. DPI allows the local performance test device 110 to recognize types of packets such as VoIP packets, Internet packets, unicast video streaming packets, multicast video packets, teleconferencing packets, data streaming, financial data streaming packets, or the like and then test each specific network traffic flow.

Before generating test network traffic, processor(s) 210 may determine information about the network and a subscriber's service, such as the subscriber's line and/or subscriber's contract. Based on the determination about the line and/or contract, processor(s) 210 may generate network traffic that is suitable to test network(s) 120 and/or 130. For example, test network traffic suitable for a line with an 80 Mb/s contract may overwhelm a 2 Mb/s line and would not produce accurate test results associated with a 2 Mb/s line.

Once suitable test network traffic is determined, processor(s) 210 may check to determine that there is no existing traffic on network(s) 120 and/or 130 that might interfere with the test measurement function. In other words, processor(s) 210 may check that an end-user is not sending or receiving traffic on network(s) 120 and/or 130. Once processor(s) 210 determines suitable test network traffic to send and determines that there is no existing traffic on network(s) 120 and/or 130, local performance test device 110 may then send the generated test network traffic towards network(s) 120 and/or 130 and the local performance test device may test the generated network traffic.

Alternatively, the end-user device(s), local performance test device 110, and/or processors 210 may observe user traffic as it traverses through buffer(s) 250 and when the buffer(s) 250 empty user traffic, the end-user device(s), local performance test device 110, and/or processors 210 may insert/generate dummy traffic to allow for the testing of traffic while the user is using the link. Then both the user's traffic and the dummy traffic would be measured—the user traffic would continue to its destination address and the dummy traffic discarded after it has been counted.

The counter(s) 240 may then be used to measure the bandwidth, packet loss, and/or frame loss of the generated network traffic that is transmitted toward the network(s) 120 and/or network(s) 130. Timer(s) 260 may be used to meter the data rate, delay, latency, jitter, and/or the like of the network traffic as it is transmitted toward the network(s) 120 and/or network(s) 130.

In order to test network traffic as it is transmitted towards the local performance test device 110 from network(s) 120 and/or network(s) 130, the network(s) 120 and/or network(s) 130 may be configured to provide the network traffic. This generated network traffic may be sourced by a device (e.g., a server, network node, network router, network switch, gateway device, and/or the like) located on network(s) 120 and/or network(s) 130.

The device located on the network may provide an interface available for a user such as a customer, an end-user of a data connection, a network provider, a service provider, a content provider, a third party, and/or the like to send a request to the device to source the generated network traffic. The device on the network may further provide an interface for a user to specify where to send the generated network traffic. The server also performs authentication and authorization services so that only authorized users can request generated network traffic.

Additionally and/or alternatively, processor(s) 210 may have the address of the device on the network and processor(s) 210 may be configured to request that the network device source test measurement network traffic.

Before sending the test network traffic, the device(s) on the network(s) 120 and/or 130 may determine information about the network and a subscriber's service, such as the customer's and/or subscriber's contract and/or line. Based on the determination about the contract and/or line, the device on network(s) 120 and/or 130 may generate network traffic that is suitable to test network(s) 120 and/or 130. For example, test network traffic suitable for a line with an 80

Mb/s contract may overwhelm a 2 Mb/s line and would not produce accurate test results associated with a 2 Mb/s line.

Once suitable test network traffic is determined, the device on the network(s) 120 and/or 130 may check to determine that there is no existing traffic on network(s) 120 and/or 130 that might interfere with the test measurement function. In other words, the device on the network(s) 120 and/or 130 may check that an end-user is not already sending or receiving traffic on network(s) 120 and/or 130. Once the device on the network(s) 120 and/or 130 determines suitable test network traffic to send and determines that there is no existing traffic on network(s) 120 and/or 130, the device on the network may send the generated test stream towards the measurement function of the local performance test device 110, and the local performance test device 110 may then be used to test the generated test network traffic.

Alternatively, an approximate measurement can be achieved by attempting to download, with processor(s) 210, a stream of data from a known source with known bandwidth capability that is greater than the subscribed-to access bandwidth service. The known source can be a test server that has a high-speed connection to the network. The test server may be able to generate test network traffic and send it to the specified destination as fast as the destination is able to receive it. It could be User Datagram Protocol ("UDP") traffic that is sequenced so that the receiver knows when packets are dropped, or it could be Transmission Control Protocol ("TCP") traffic that employs flow control as the link becomes congested.

Local performance test device 110 may further include at least two switches 220 and 230 in communication with network(s) 120 and 130. Switches 220 and 230 may be used to direct network traffic from and/or toward network(s) 120 and/or 130 through the local performance test device 110 and/or the test measurement function of the local performance test device 110.

During normal operation (i.e., when local performance test device 110 is not testing service provider network(s) 120 and/or local area network(s) 130), unaltered network traffic may pass through at the line rate (i.e., at the rate it comes in) from and/or to the service provider network 120 and/or local area network through the at least two switches 220 and 230 without being re-routed through counter(s) 240 and buffer(s) 250. However, when a performance test is configured and/or requested, network traffic from or travelling to service provider network 120 and/or local area network 130 may be re-routed at the line-rate through a test measurement function by switch(es) 220 and/or 230. The network traffic may be unaltered and transmitted at line-rate so that a user connected to the service provider network and/or the local area network does not experience any interruption, corruption, and/or delay in his or her service.

A test measurement function of local performance test device 110 may include one or more counters 240, one or more buffers 250, and one or more timers 260, and/or the like. In order to test network traffic coming from and/or towards network(s) 120 and 130, the unaltered network traffic may be re-routed at line-rate through counter(s) (and/or other test function) 240 into buffer(s) 250. After passing through counter(s) (and/or other test function(s)) 240 into buffer(s) 250, the unaltered network traffic may then be routed back to switch(es) 220 and/or 230 at line-rate.

Counter(s) 240 may be used to provide information as to how well a network is performing. Counter(s) 240 may be used to count data packets as the packets are passing through the test measurement function of local performance test device 110. Counter(s) 240 may be used to measure bandwidth, packet loss, frame loss, and/or the like.

The purpose of the buffer(s) 250 is to allow the network traffic to pass through to the buffer(s) 250 at line-rate. This allows measurement of the bandwidth, packet loss, frame loss, and/or the like from (and/or traveling to) the network(s) 120 and 130 towards (and/or from) the local performance test device to be unimpeded until the buffer(s) 250 is full in order to gain an accurate measurement. The size of the buffer(s) 250 can be selected based on the sample size of the intended test and maximum bandwidth that may be under test. The result of the test (e.g., the measured bandwidth, or other network condition or network performance characteristic, or the like) may be stored in memory device(s) 270.

Merely by way of example, it is expected that the source of the network traffic (e.g., data from the customer) would be provided at a rate faster than what the network connection can accommodate. A flow control protocol throttles the network traffic coming into the buffer(s) 250 so that it does not overflow. The transmitter transmits the network traffic in the buffer as fast as the link allows. As long as the buffer is not empty, network traffic can be transmitted and counted by counter(s) 240 as fast as possible. The counter(s) 240 then counts the traffic being transmitted at line-rate against a time base provided by timer(s) 260 to determine the rate that the network traffic is being transmitted. If the buffer(s) 250 empties, the counter(s) 240 will need to stop and the time base provided by timer(s) 260 will need to stop until there is more traffic to transmit.

If the network connection is able to transmit network traffic to the customer faster than the customer can consume it, the buffer(s) 250 may be used to capture the overflow network traffic and hold the network traffic until the customer can use it. Thus, the performance test device may continue receiving and counting packets from the network even if the customer's device is slow until the buffer(s) 250 is filled.

Timer(s) and/or clock(s) 260 may be used to time network traffic as it passes through the at least two switches 220 and 230 and/or as network traffic is re-routed through counter(s) 240 into buffer(s) 250. Timer(s) 260 may further be used to establish a timing baseline to ensure that test results are accurate. In order to establish a timing baseline, the rate at which network traffic passes through the local performance test device 110, switches 220 and 230, and/or counter(s) 240 into buffer(s) 250 may be compared with timer(s) and/or clock(s) 260 to validate performance. The timer(s) 260 may be used to meter the data rate, speed of the network traffic, throughput, delay, jitter and/or the like. Timer(s) 260 may be communicatively coupled to switches 220 and 230 and/or it may be communicatively coupled to counter(s) 240 and/or buffer(s) 250.

Memory 270 may be used to store results of a performance test obtained from counter(s) 240, buffer(s) 250, and timer(s) 260. These results may include measured bandwidth, packet loss, frame loss, speed of the network traffic, data rate, throughput, jitter, delay, and/or the like. The memory device(s) 270 may be configured to send the results to a requesting user device and/or a server on the network. These results may be sent at the end of a test or periodically (e.g., hourly, daily, weekly, monthly, etc.). The results may be sent over the network when the processor(s) 210 determines that an end user is not using network(s) 120 and/or 130.

The memory 270 may further be configured to only release results of a test when an authorized user requests the results. An authorized user may have to enter a password and/or other form of authentication to access the results to the test. Local performance test device 110 may also verify a user's IP address before allowing a user to access the results of the test. The path (which may be wired and/or wireless) for addressing the memory device(s) 270 may either be through an external path or a path through the local performance test device 110.

The results obtained about bandwidth, packet loss, data rate, data speed, delay, jitter, and/or the like may be compared with historical results to determine a typical problem that may be occurring or to determine if a typical problem occurs during a specific time of day, week, year, etc. Further, the results may be used to determine whether an additional test needs to be run by the local performance test device and/or to determine a type of problem that is occurring in network(s) 120 and/or 130. The results of the test may further be used to determine whether a network connection (e.g., an Internet connection) is established and/or (if established) is experiencing connectivity issues in network(s) 120 and/or 130.

Local performance test device 110 may further comprise at least two switches 220, at least two switches 230, at least two counter(s) (and/or test function) 240, at least two buffer(s) 250, and at least two timer(s) 260. The at least two switches 220, a first counter (and/or test function) 240, a first buffer 250, and a first timer 260 may be associated with service provider network 120 and the at least two switches 230, a second counter (and/or test function) 240, a second buffer 250, and a second timer 260 may be associated with local area network 130. By having at least two switches 220, at least two switches 230, at least two counter(s) (and/or test function) 240, at least two buffer(s) 250, and at least two timer(s) 260, a first performance test may be performed on a first stream of network traffic associated with network 120 simultaneously with a second performance test on a network traffic associated with network 130. The performance tests on the network traffic associated with network 120 and the network traffic associated with network 130 may be performed in much the same way as the performance tests described above.

Figure 3A:
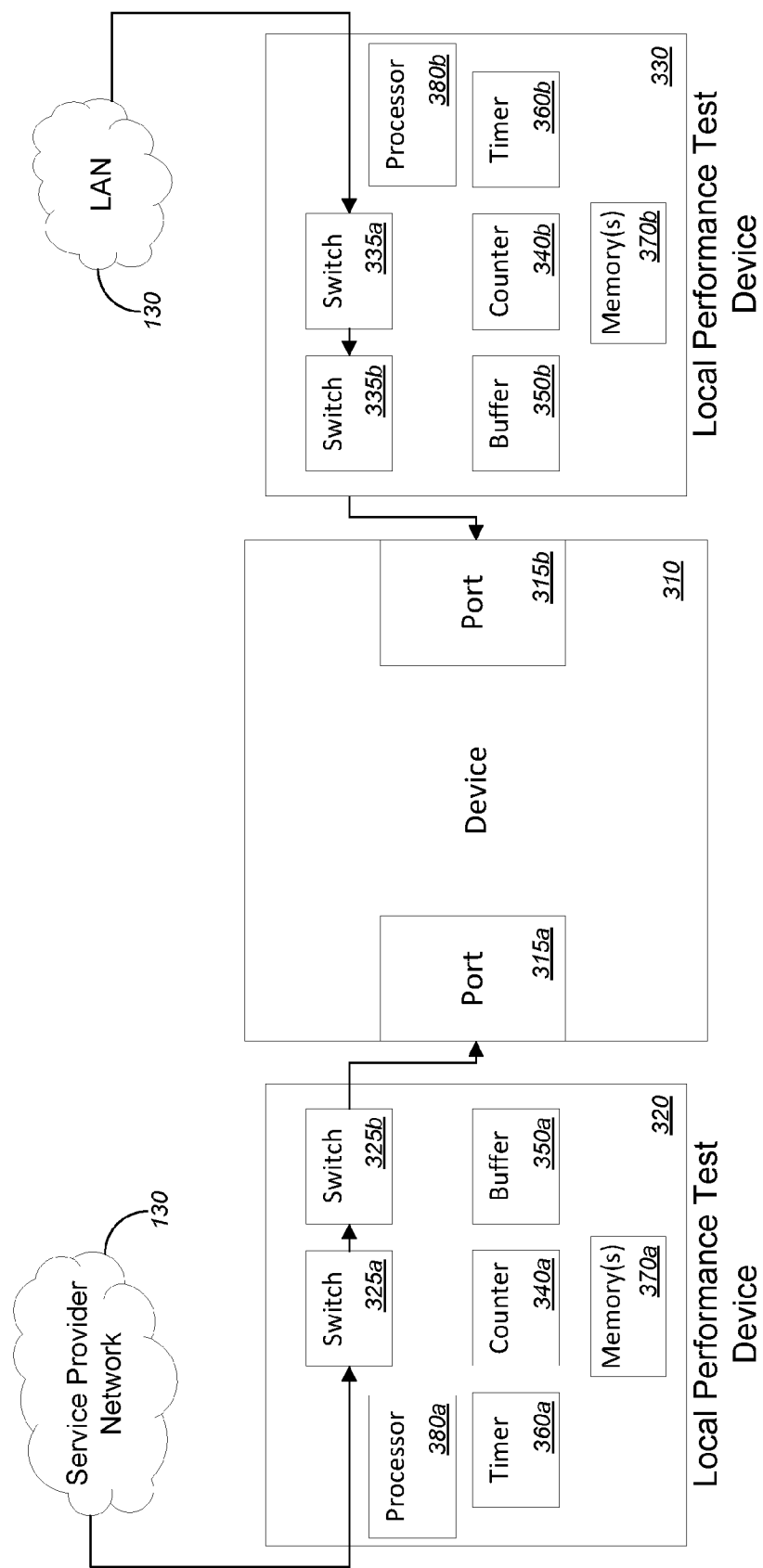
FIGS. 3A and 3B are schematic diagrams illustrating various systems for implementing local performance testing, in accordance with various embodiments.
Figure 3B:
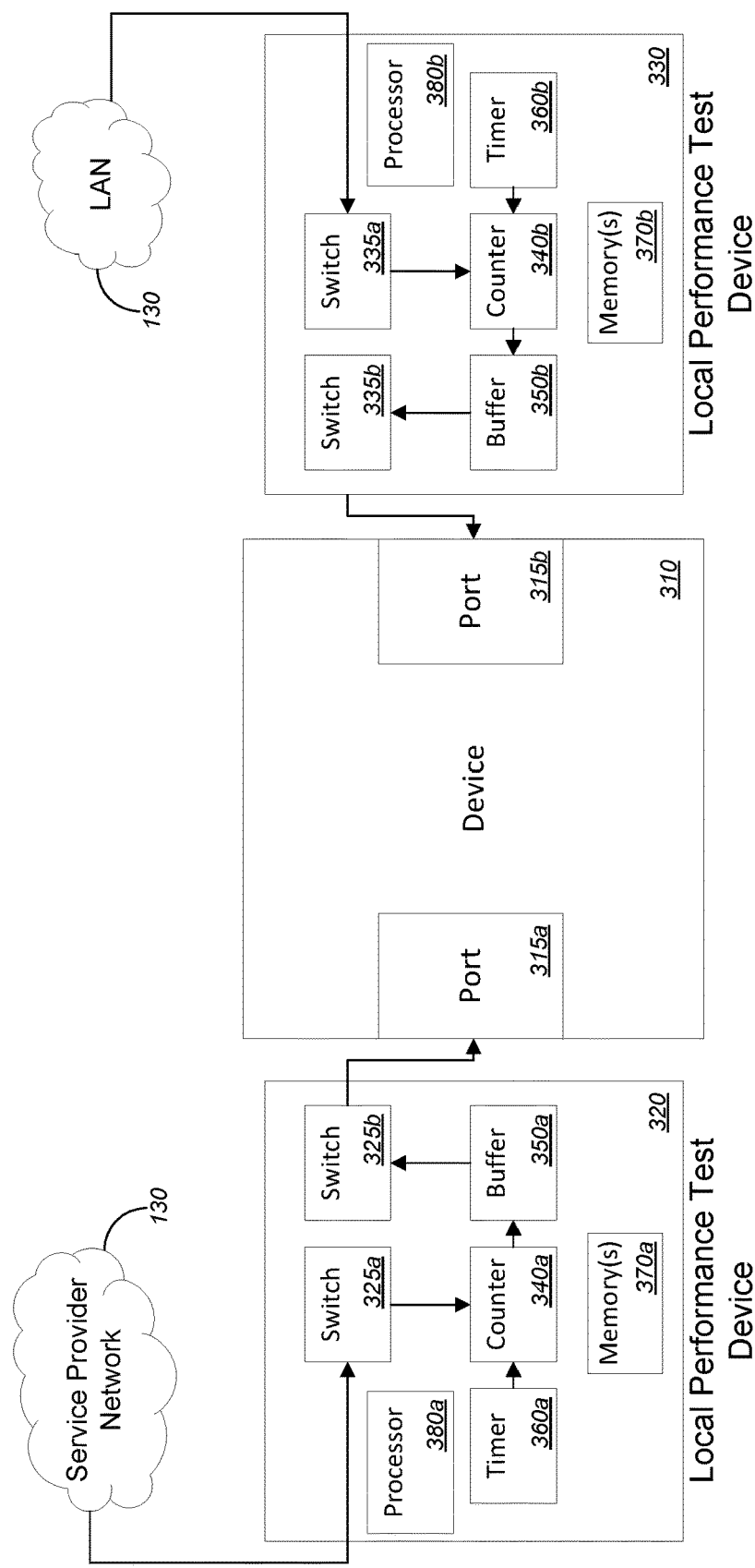

FIGS. 3A and 3B (collectively, "FIG. 3") are schematic diagrams illustrating various systems 300 and 300' for implementing local performance testing, in accordance with various embodiments. In FIG. 3, device 310 could be at least one of a gateway, modem, router, optical network terminal, radio, and/or the like. Device(s) 310 may comprise at least one port 315 that is in communication with at least one of service provider network 120 and/or local area network 130. However, device 310 may also comprise at least two ports 315a and 315b. Port 315a may be in communication with service provider network(s) 120 (e.g., access network(s), core network(s), or the like) and port 315b may be in communication with a local area network(s) 130.

The system 300 and 300' may comprise a first local performance test device 320 and/or a second local performance test device 330 to perform test measurement functions. Local performance test device 320 may be associated and communicatively coupled with a service provider network (e.g., an access network, a core network, or the like) 120 and local performance test device 330 may be associated and communicatively coupled with local area network 130. Local performance test devices 320 and 330 may be incorporated within a single device 310 that encloses the entirety of the local performance test devices 320 and/or 330. Alternatively, local performance test devices 320 and 330 may be relatively separate from, but communicatively coupled via ports 315a and 315b to device 310.

A communication path may connect local performance test device 320 with local performance test device 330. The communication path between local performance test device 320 and local performance test device 330 may be an external communication path or it may take advantage of an existing communication path in a gateway device, modem, router, optical network terminal, and/or the like. Alternatively and/or additionally, the local performance test device 320 and the local performance test device 330 may be communicatively coupled together either via in-band signaling and/or out-of-band signaling to permit measurement data results to be passed between the local performance test device 320 and the local performance test device 330. For example, if there are the local performance test device 320 and the local performance test device 330 are on both sides of a customer gateway device, then the service provider can gain visibility into the performance of the local area network side of the customer gateway or the customer can gain visibility into the performance of the service provider network side of the customer gateway. The local performance test device 320 and the local performance test device 330 may be configured to send results to a designated collection point or store the results locally for subsequent retrieval by authorized parties. Alternatively, local performance test device 320 and 330 may function independently of each other and not be communicatively coupled to each other.

Local performance test device 320 may be configured to terminate the physical layer of the service provider network 120 and local performance test device 320 may be configured to terminate the physical layer of local area network 130. Local performance test device 320 may be placed between cabling for network 120 and cabling and/or a port 315a for device 310. Local performance test device 330 may be placed between cabling for local area network 130 and cabling and/or a port 315b for device 310. If a device 310 wirelessly transmits a signal and/or network traffic, the local performance test devices 320 and 330 may be integrated in device 310 to perform measurements before the network traffic and/or signal is electro-magnetically transmitted over the air.

The various components of local performance test devices 320 and 330 may be incorporated within a single housing that encloses the entirety of the local performance test devices 320 and/or 330. The various components of local performance test devices 320 and/or 330 may include, but are not limited to, one or more switches 325a, 325b, 335a, and 335b, one or more counters 340a and 340b, one or more buffers 350a and 350b, one or more timers 360a and 360b, one or more memories 370a and 370b, and/or one or more processors 380a and 380b. However, certain structural components of the local performance test devices 320 and 330 may be relatively more integrated and/or relatively more separated. Thus, the local performance test devices 320 and 330 depicted by FIGS. 3A and 3B should be considered a set of functional components, which may or may not correspond to individual structures. Moreover, while certain functional components of exemplary local performance test devices 320 and 330 depicted by FIGS. 3A and 3B are illustrated by FIGS. 3A and 3B, the exemplary local performance test devices 320 and 330 might have one or more components of a general purpose computer system, as described below with respect to FIG. 7.

Local performance test devices 320 and/or 330 may include one or more processors 380a and 380b. Local performance test devices 320 and 330 may use the same processor 380 or have their own dedicated processors (processor 380a and processor 380b). The one or more processors 380*a* and 380*b* may be in communication with one or more switches 325*a* and 325*b* and 335*a* and 335*b*, one or more counters (and/or other test function(s)) 340*a* and 340*b*, one or more buffers 350*a* and 350*b*, one or more timers 360*a* and 360*b*, and/or one or more memories 370*a* and 370*b*. A computer readable medium may be in communication with the one or more processors 380*a* and 380*b* (collectively, "processor(s) 380" or the like).

Processor(s) 380 may be configured to direct the test measurement function of local performance test devices 320 and 330 to test the Internet or network connection periodically (e.g., hourly, daily, weekly, monthly, or the like). Additionally and/or alternatively, processor(s) 380 may be configured to receive input from a user requesting that a test of the data connection, the network connection, and/or the packet based service connection be performed. This user input may be from interaction through a button (or other user interface device, or the like) and/or a sensor(s) communicatively coupled to processor(s) 380 and/or through a requesting user device communicatively coupled to processor(s) 380. After receiving the user input, the processor(s) 380 may direct the test measurement function of local performance test device(s) 320 and/or 330 to test the Internet, network connection, device(s) communicatively coupled to the network, node(s) in the network, and/or the like. This test of the service provider network and the local area network may be performed simultaneously and/or independently.

Turning to FIG. 3A, FIG. 3A represents a system 300 for implementing local performance testing where a performance test has not been requested and/or a test function has not been configured. In the case where a performance test has not been requested and/or a test function has not been configured, one or more processors 380*a* and 380*b* may direct one or more switches 325*a*, 325*b*, 335*a*, and 335*b* to pass through unaltered network traffic at line-rate from/to network(s) 120 to/from network(s) 130. In other words, network traffic may pass through local performance test devices 320 and 330 without configuring the test measurement function and/or re-routing the stream of network traffic through counter(s) 340*a* and/or 340(*b*) and buffer(s) 350(*a*) and/or 350(*b*).

Further, as shown in FIG. 3A, when a test has not been configured, network traffic transmitted through local performance test device 320 may be transmitted from the service provider network 120 through switch 325*a* and switch 325*b* to device 310. The network traffic may also pass through switches 325*a* and 325*b* in the opposite direction, i.e., network traffic transmitted through local performance test device 320 may be transmitted to the service provider network 120 through switch 325*b* and switch 325*a* from device 310. The same type of functionality occurs in local performance test device 330, network traffic may be transmitted from the local area network 130 through switch 335*a* and switch 335*b* to device 310 and/or to the local area network 130 through switch 335*a* and switch 335*b* to device 310.

FIG. 3B represents a system 300 for implementing local performance testing when a performance test has been requested and/or a test function has been configured.

In order to configure the test measurement function of device 310, local performance test device 320, and/or local performance test device 330 may be network addressable by an authorized user. The local performance measurement device 110 (shown in FIG. 1), device 310, local performance test device 320 and/or local performance test device 330 may be addressable through a requesting device 125 (associated with a service provider) and/or requesting device 135 (associated with a user and/or customer) or a user may interact directly with local performance measurement device 110, device 310, local performance test device 320 and/or local performance test device 330 to request and/or configure a test of network(s) 120 and/or 130. An authorized user may request and/or configure a performance test measurement function to determine whether a performance issue is occurring in a service provider network 120 and/or a local area network 130. An authorized user may configure the test measurement function to test only the service provider network 120 and/or the local area network 130 or an authorized user may configure the test measurement function to test both the service provider network 120 and the local area network 130.

Additionally and/or alternatively, local performance test device 110, device 310, local performance test device 320 and/or local performance test device 330 may further be configured to perform a test of network(s) 120 and/or 130 on a periodic basis (e.g., hourly, daily, weekly, monthly, etc.).

Once a test is requested, requesting device 125, requesting device 135, local performance test device 110, and/or device 310 may configure local performance test devices 320 and/or 330 to test the network traffic. Once a test measurement function is configured, local performance test devices 320 and/or 330 may be used to determine a condition of network(s) 120 and/or 130. Network conditions that may be determined include, but are not limited to, bandwidth, packet loss, frame loss, data rate, data speed, throughput, delay, jitter, and/or the like.

Once a test measurement function is configured, processors 380*a* and/or 380*b* may direct switch(es) 325*a*, 325*b*, 335*a*, and/or 335*b* to re-route the network traffic into the test measurement portion of the local performance test devices 320 and/or 330. In order to test the network traffic, the unaltered network traffic may be re-routed at line-rate by switches 325*a*, 325*b*, 335*a*, and/or 335*b* through counter(s) 340*a* and/or 340*b* into buffer(s) 350*a* and/or 350*b*. After testing the network traffic, the buffer(s) 350*a* and/or 350*b* may route the unaltered network traffic back to switch(es) 325*a*, 325*b*, 335*a*, and/or 335*b* at line rate.

Instead of re-routing the network traffic, the network traffic may be duplicated by the local performance test device(s) 320 and/or 330. The original traffic may continue to flow as if nothing happened. The duplicated network traffic may be sent to the test measurement function of performance test device 320 and/or 330. The duplicated network traffic may then be tested and/or analyzed by the test measurement function and after testing the duplicated network traffic may be discarded.

Local performance test devices 320 and/or 330 may be used to test network traffic as it is transmitted towards and/or from local performance test devices 320 and/or 330. In order to test network traffic as it is transmitted from local performance test device 310 to network(s) 120 and/or 130, local performance test device may test existing network traffic that is being transmitted from/to network(s) 120 to/from network(s) 130. The existing network traffic may be generated by an end-user connected to network(s) 120 and/or 130. Processor(s) 380*a* and/or 380*b* may additionally configure the local performance test devices 320 and/or 330 to generate test network traffic and transmit the test network traffic towards the network(s) 120 and/or network(s) 130. The counter(s) 340*a* and/or 340*b* may then be used to measure the bandwidth that is transmitted toward the network(s) 120 and/or network(s) 130 and/or packet loss. Timer(s) 360*a* and/or 360*b* may be used to meter the data rate, delay, jitter, and/or the like of the network traffic as it is transmitted toward the network(s) 120 and/or network(s) 130.

Before generating test network traffic, processor(s) 380*a* and/or 380*b* may determine information about the network and a subscriber's service, such as the customer's and/or subscriber's contract. Based on the determination about the line, processor(s) 380*a* and/or 380*b* may generate a network traffic that is suitable to test network(s) 120 and/or 130. For example, test network traffic suitable for a line with an 80 Mb/s capability may overwhelm a 2 Mb/s line and would not produce accurate test results associated with a 2 Mb/s line.

Once suitable test network traffic is determined, processor(s) 380*a* and/or 380*b* may check to determine that there is no existing traffic on network(s) 120 and/or 130 that might interfere with the test measurement function. In other words, processor(s) 380*a* and/or 380*b* may check that an end-user is not already sending traffic on network(s) 120 and/or 130. Once processor(s) 380*a* and/or 380*b* determines suitable test network traffic to send and that there is no existing traffic on network(s) 120 and/or 130, local performance test device(s) 320 and/or 330 may then send the generated test network traffic towards network(s) 120 and/or 130 and the test measurement function of local performance test device(s) 320 and/or 330 may test the generated network traffic.

In order to test network traffic as it is transmitted towards local performance test devices 320 and/or 330 from network(s) 120 and/or network(s) 130, the network(s) 120 and/or network(s) 130 must be configured to provide the network traffic. This generated network traffic may be sourced by a device (e.g., a server and/or the like) located on network(s) 120 and/or network(s) 130.

The device located on the network may provide an interface available for a user such as a customer, an end-user of a data connection, a network connection, a packet based service, a network provider, a service provider, a content provider, a third party, and/or the like to request that the device source the generated network traffic. The device on the network may further provide an interface for a user to specify where to send the generated network traffic. The server also performs authentication and authorization services so that only authorized users can request generated network traffic.

Additionally and/or alternatively, processor(s) 380 may have the address of the device on the network, and processor(s) 380 may be configured to request that the network device source test measurement network traffic.

Before sending the test network traffic, the device(s) on the network(s) 120 and/or 130 may determine information about the network and a subscriber's service, such as the customer's and/or subscriber's contract and/or line. Based on the determination about the contract and/or line, the device on network(s) 120 and/or 130 may generate network traffic that is suitable to test network(s) 120 and/or 130. For example, test network traffic suitable for a line with an 80 Mb/s contract may overwhelm a 2 Mb/s line and would not produce accurate test results associated with a 2 Mb/s line.

Once suitable test network traffic is determined, the device on the network(s) 120 and/or 130 may check to determine that there is no existing traffic on network(s) 120 and/or 130 that might interfere with the test measurement function. In other words, the device on the network(s) 120 and/or 130 may check that an end-user isn't already sending traffic on network(s) 120 and/or 130. Once the device on the network(s) 120 and/or 130 determines a suitable test network traffic to send and that there is no existing traffic on network(s) 120 and/or 130, the device on the network may send a the generated test stream towards the measurement function of the local performance test device 310 and the local performance test device 310 may then be used to test the generated test network traffic.

Alternatively, an approximate measurement can be achieved by attempting to download, with processor(s) 380*a* and/or 380*b*, a stream of network traffic from a known source with known bandwidth capability that is greater than the subscribed-to Access bandwidth service. The known source can be a test server that has a high-speed connection to the network. The test server may be able to generate test network traffic and send it to the specified destination as fast as the destination is able to receive it. It could be User Datagram Protocol ("UDP") traffic that is sequenced so that the receiver knows when packets are dropped, or it could be Transmission Control Protocol ("TCP") traffic that employs flow control as the link becomes congested.

Local performance test devices 320 and/or 330 may further include switches 325*a*, 325*b*, 335*a*, and 335*b* in communication with network traffic transmitted to/from network(s) 120 and 130. Based on instructions from processor(s) 380*a* and/or 380*b*, switches 325*a*, 325*b*, 335*a*, and 335*b* may be used to re-route unaltered network traffic at line-rate into counter(s) 340*a* and/or 340*b* into buffers 350*a* and/or 350*b*. The network traffic may be unaltered and transmitted at line-rate so that a user connected to access network and/or local area network does not experience any interruption, corruption, and/or delay in his or her service.

In a non-limiting example shown in FIG. 3B, when a performance test is configured and/or requested to test network 120, local performance test device 320 may be configured to perform the test measurement function. Switch 325*a* may re-route the unaltered network traffic from network(s) 120 at line-rate through counter 340*a* into buffer 350*a*. After passing through buffer 350*a*, the unaltered network traffic may be routed back through switch 325*b* to device 310. If the network traffic is travelling toward network(s) 120, switch 325*b* may re-route the unaltered network traffic at line-rate from device 310 through counter 340*a* into buffer 350*a*. After passing through buffer 350*a*, the unaltered network traffic may be routed back through switch 325*a* to network(s) 120.

Local performance test device 330 can have the same functionality as local performance test device 320. For example, switch 335*a* may re-route the unaltered network traffic from network(s) 130 at line-rate through counter 340*b* into buffer 350*b*. After passing through buffer 350*b*, the unaltered network traffic may be routed back through switch 335*b* to device 310. If the network traffic is travelling toward network(s) 130, switch 335*b* may re-route the unaltered network traffic at line-rate from device 310 through counter 340*b* into buffer 350*b*. After passing through buffer 350*b*, the unaltered network traffic may be routed back through switch 335*a* at line rate to network(s) 120.

Counter(s) 340*a* and/or 340*b* may be used to provide information as to how well a network is performing. Counter(s) 340*a* and/or 340*b* may be used to count data packets as the packets are passing through the test measurement function of local performance test device 310. Counter(s) 340*a* and/or 340*b* may be used to measure bandwidth, packet loss, frame loss, and/or the like.

The purpose of the buffer(s) 350*a* and/or 350*b* is to allow the network traffic to pass through to the buffer(s) 350*a* and/or 350*b* at line-rate. This allows measurement of the bandwidth coming from (and/or traveling to) the network(s) 120 and 130 towards (and/or from) the local performance test device to be unimpeded until the buffer(s) 350*a* and/or 350*b* is full in order to gain an accurate measurement. The size of the buffer(s) 350*a* and/or 350*b* can be selected based on the sample size of the intended test and maximum bandwidth that may be under test. The result of the test (e.g., the measured bandwidth, or other network condition or network performance characteristic, or the like) may be stored in memory(s) 370*a* and/or 370*b*.

Timer(s) and/or clock(s) 360*a* and/or 360*b* may be used to time network traffic as it passes through the switches 325*a*, 325*b*, 335*a*, and/or 335*b* and/or as network traffic is re-routed through counter(s) 340*a* and/or 340*b* into buffer(s) 350*a* and/or 350*b*. Timer(s) 360 may further be used to establish a timing baseline as the unaltered network traffic passes through switches 325*a*, 325*b*, 335*a*, and/or 335*b* and/or counter 340*a* and/or 340*b* into buffer(s) 350*a* and/or 350 at line-rate to ensure that test results are accurate. In order to establish a timing baseline, the rate at which network traffic passes through the local performance test device 310, switches 325*a*, 325*b*, 335*a*, and/or 335*b*, and/or counter(s) 340*a* and/or 340*b* into buffer(s) 350*a* and/or 350 may be compared with timer(s) and/or clock(s) 360*a* and/or 360*b* to validate performance. The timer(s) 360*a* and/or 360*b* may be used to meter the data rate, speed of the network traffic, throughput, delay, jitter, and/or the like. Timer(s) 360*a* and/or 360*b* may be communicatively coupled to switches 325*a*, 325*b*, 335*a*, and/or 335*b* and/or it may be communicatively coupled to counter(s) 340*a* and/or 340*b* and/or buffer(s) 350*a* and/or 350*b*.

Local performance test devices 320 and/or 330 may include one or more memory devices 370*a* and 370*b*. Local performance test devices 320 and 330 may use the same memory 370 or have their own dedicated memories (memory 370*a* and memory 370*b*). Memory 370*a* and/or 370*b* may be used to store results of a performance test obtained from counter(s) 340*a* and/or 340*b*, buffer(s) 350*a* and/or 350*b*, and timer(s) 360*a* and/or 360*b*. These results may include measured bandwidth, speed of the network traffic, throughput, data rate, jitter, delay, and/or the like. The memory 370*a* and/or 370*b* may be configured to send the results to a requesting user device and/or a server on the network.

The memory 370*a* and/or 370*b* may further be configured to only release results of a test when an authorized user requests the results. An authorized user may have to enter a password and/or other form of authentication to access the results to the test. Local performance test device 310 may also verify a user's IP address before allowing a user to access the results of the test. The path (which may be wired and/or wireless) for addressing the memory 370*a* and/or 370*b* may either be through an external path or a path through the local performance test device 310.

By having at least two local performance test devices 320 and 330 with a corresponding test measurement function, a performance test of network(s) 120 and network(s) 130 may be performed simultaneously. Further, the results of the tests of network(s) 120 and network(s) 130 may be compared to determine whether a performance issue is occurring on network(s) 120 and/or network(s) 130.

FIGS. 4A-4H (collectively, "FIG. 4") are schematic diagrams illustrating various systems 400 for implementing local performance testing device 405, in accordance with various embodiments. The various components of system 400 may be relatively more integrated or relatively separated. Thus, the system 400 depicted by FIG. 4 should be considered a set of functional components, which may or may not correspond to individual structures. Moreover, while certain functional components of system 400 are illustrated by FIG. 4, the system 400 might have a networked system of components such as computers, computing systems, and/or system hardware architecture, as described below with respect to FIG. 7.

Further, while the components are depicted and/or described in a certain order for purposes of illustration, it should be appreciated that one or more components may be reordered and/or omitted within the scope of various embodiments. Further, with respect to performance device 405 and inserts 410, one or more performance device(s) 405 and insert(s) 410 may be located in the networked system and are not limited to the only the locations represented in FIG. 4.

The system 400 of FIG. 4 comprises a test device(s) 405 and an insert(s) 410. The test device(s) 405 comprises the processing functions and performs test measurement functions on the received network traffic. Insert(s) 410 provide the connection into the communications link. The insert(s) 410 can be a physical insert(s) that is physically inserted into the communications path 425 or it can be integrated into the communications path 425. The insert(s) 410 may further be integrated and/or separate from the local performance test device(s) 405. The insert(s) 410 may be used to re-route and/or duplicate an existing and/or generated network traffic flow to the test measurement function of the test device(s) 405.

The networked system 400 may further comprise a gateway 415 that communicatively couples a service provider network 435 through access network termination technology 420 (e.g., a modem) to a local area network 450 through local area network technology 445 (e.g., a wireless access point). A communication path 425 may be used to transmit network traffic from/to service provider network 435 to/from local area network 450. An access node(s) 430 may exist in service provider network 435. A collection server 440 that collects data from the local performance test device 405 may be communicatively coupled local performance test device 405 through service provider network 435. A customer device 455 may be communicatively coupled to local area network 450.

The local performance test device 405 may be used to test, with the test measurement function, the performance of a gateway 415, a service provider network 435, access network termination technology 420, a local area network 450, local area network technology 445, a communication path 425, an access node(s) 430, a collection server 440, and a customer device 455.

Figure 4A:
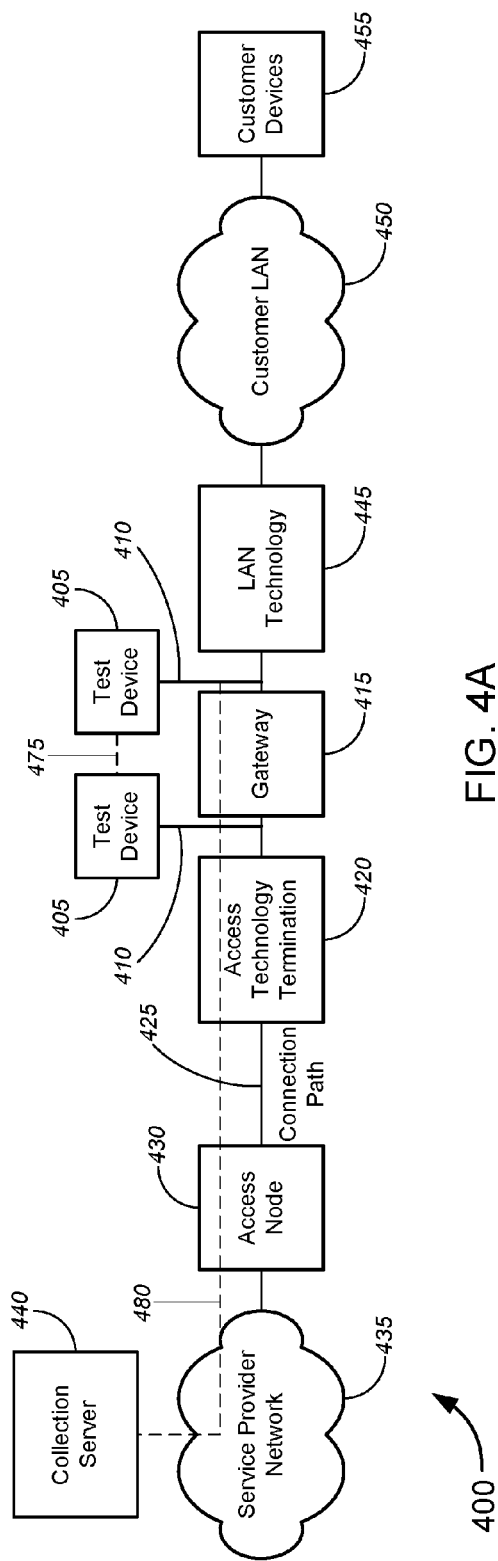
FIGS. 4A-4H are schematic diagrams illustrating various systems for implementing local performance testing, in accordance with various embodiments.

Turning to FIG. 4A, FIG. 4A shows two performance test devices 405 and two inserts 410 that are not integrated with gateway 415. The performance test devices 405 may be used to test the performance of the gateway 415, the service provider network connection, the access termination technology 420, the local area network connection, the local area network technology 445, the customer device 455, or the like.

The performance test devices 405 may have an in-band or out-of-band connection such that test device 405 located on the server provider network side of the gateway 415 can share performance data and/or measurement with the test device 405 located on the customer side of the gateway 415 and vice versa. By allowing test device 405 located on the server provider network side of the gateway 415 to communicate with the test device 405 located on the customer side of the gateway 415, the service provider can gain visibility into the performance of the local area network side of the customer gateway or the customer can gain visibility into the performance of the service provider network side of the customer gateway. This logical communication path is represented by logical communication path 475 shown in FIG. 4A.

The two test devices 405 may be configured to either store results locally for subsequent retrieval or forward the results to a data collection server 440. The results may be sent to the data collection server 440 via logical connection path 480.

Figure 4B:
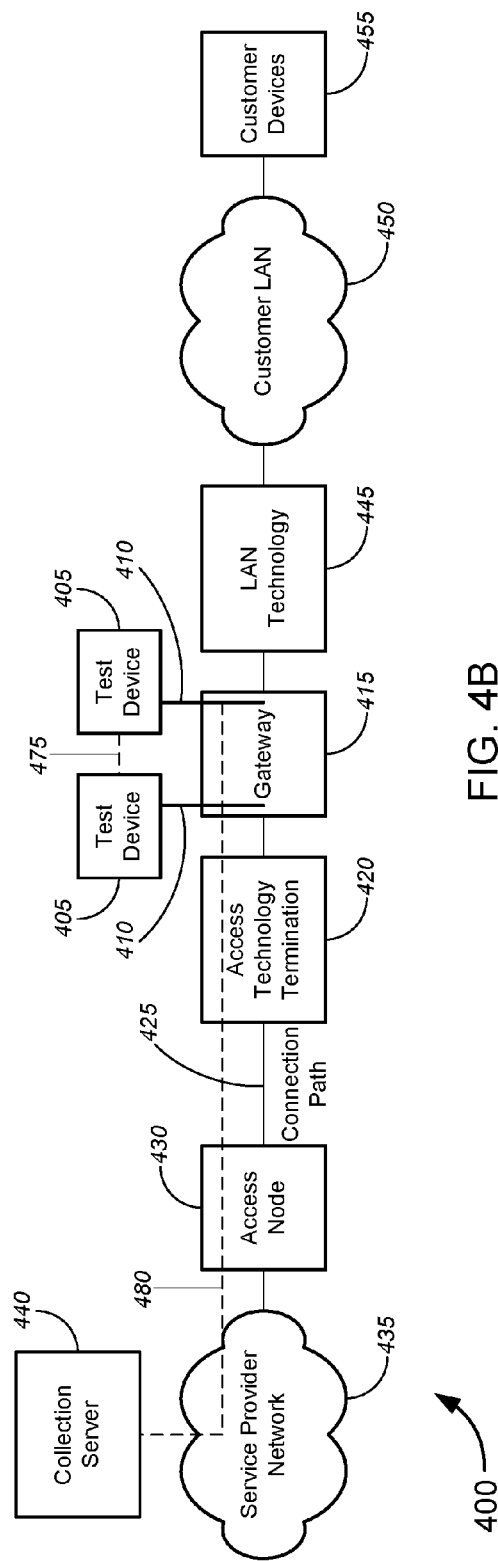

FIG. 4B shows two inserts 410 that are integrated with gateway 415. The performance test devices 405 may also be integrated with gateway 415. The performance test device may be used to test the performance of the gateway 415, the service provider network connection, the access termination technology 420, the local area network connection, the local area network technology 445, the customer device 455, or the like.

Figure 4C:
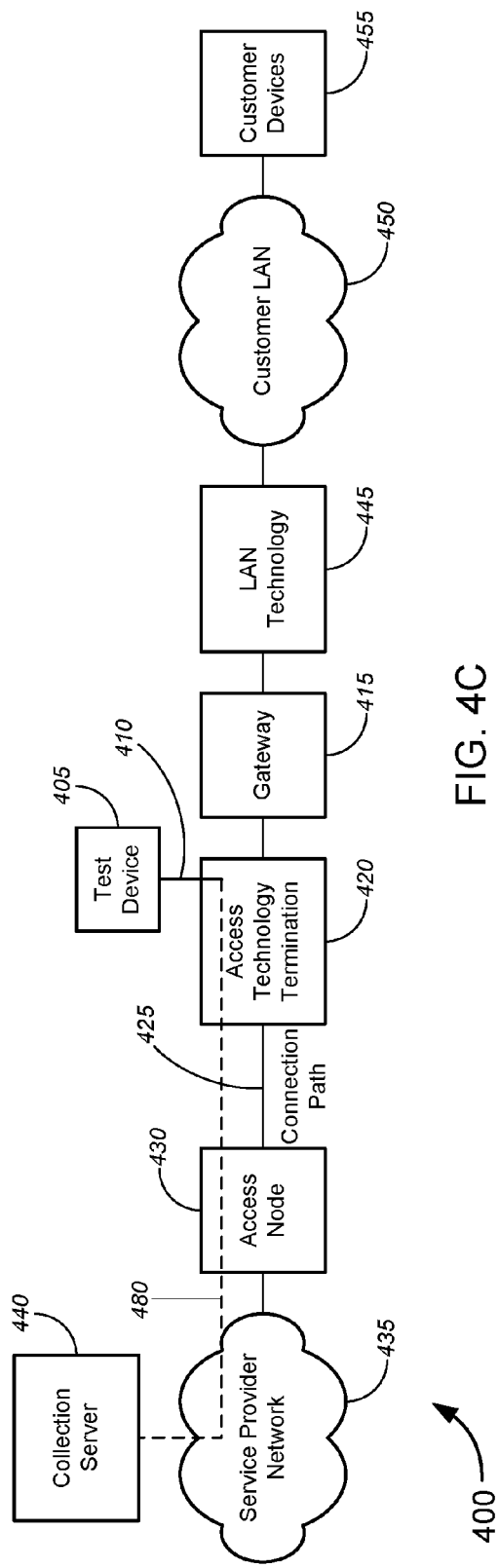

FIG. 4C represents an insert 410 that is integrated with access termination technology 420. The performance test device 405 may also be integrated with access termination technology 420. The performance test device 405 may be used to test the performance of the gateway 415, the service provider network connection, the access termination technology 420, or the like.

Figure 4D:
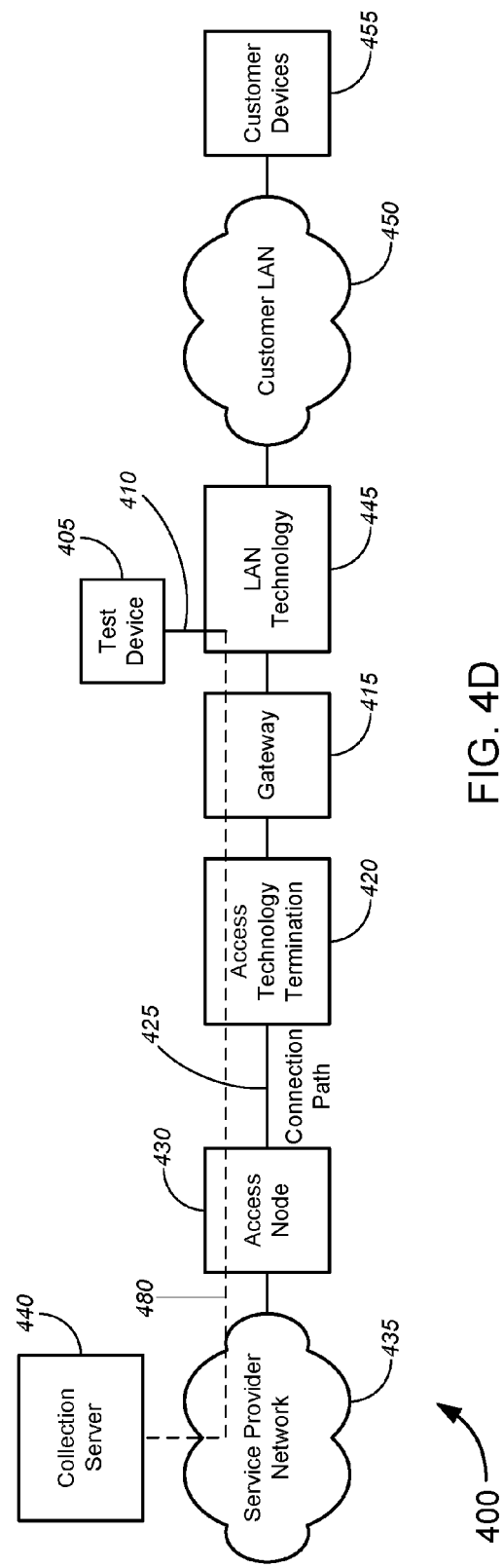

FIG. 4D represents an insert 410 that is integrated with local area network technology 445. The performance test device 405 may also be integrated with local area network technology 445. The performance test device 405 may be used to test the performance of the gateway 415, the local area network connection, the local area network technology 445, the customer device 455, or the like.

Figure 4E:
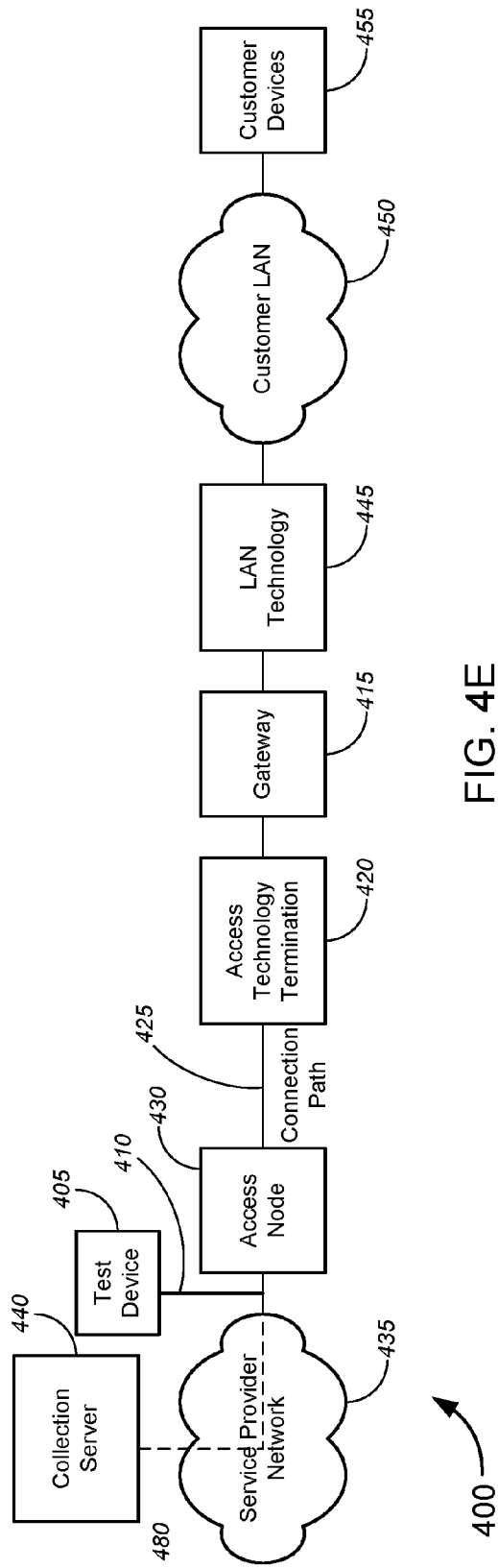

FIG. 4E represents a performance test device 405 and an insert 410 that are located between an access node 430 and a service provider network connection. The local performance test device may be integrated with and/or separate from the access node 430. The performance test device 405 may be used to test the performance of the access node 430, the service provider network connection, and/or the like.

Figure 4F:
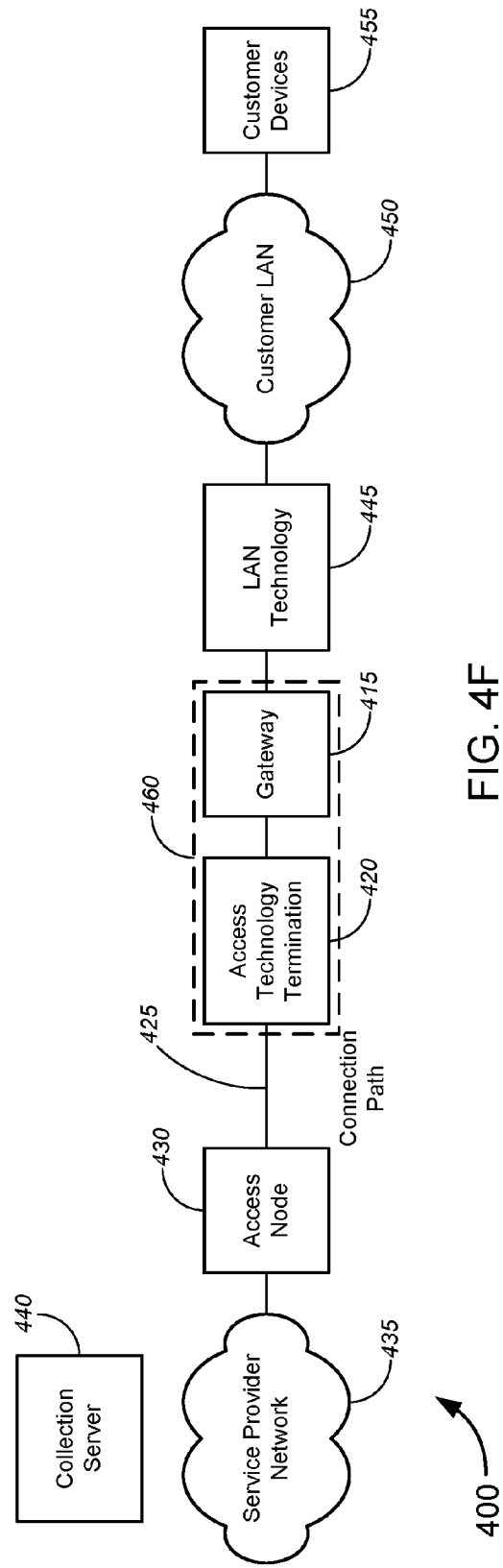

FIG. 4F represents a system 460 that integrates the gateway device 415 with the access termination technology 420. The local performance test device(s) 405 and insert(s) 410 may be located anywhere in networked system 400, including, but not limited to, the locations shown in FIGS. 4A-4E. The local performance test device may also be integrated into the integrated device 460 comprising the integrated gateway device 415 and the access termination technology 420.

Figure 4G:
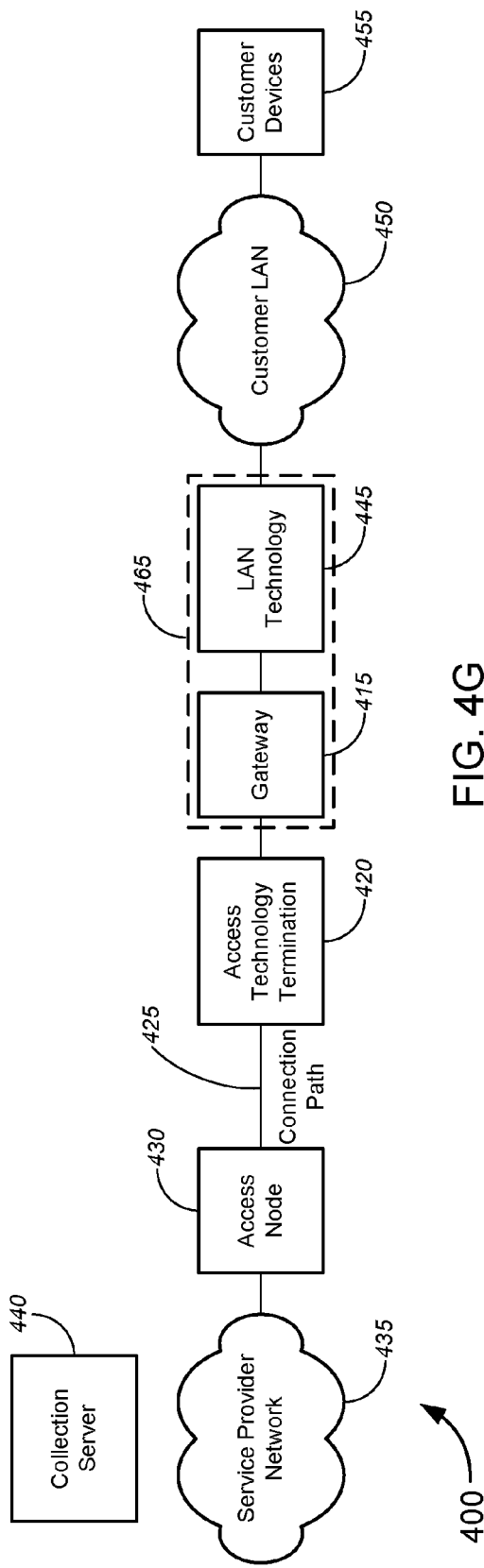

FIG. 4G represents a system 465 that integrates the gateway device 415 with the local area network technology 445. The local performance test device(s) 405 and insert(s) 410 may be located anywhere in networked system 400, including, but not limited to, the locations shown in FIGS. 4A-4E. The local performance test device may also be integrated into the integrated device 465 comprising the gateway device 415 and the local area network technology 445.

Figure 4H:
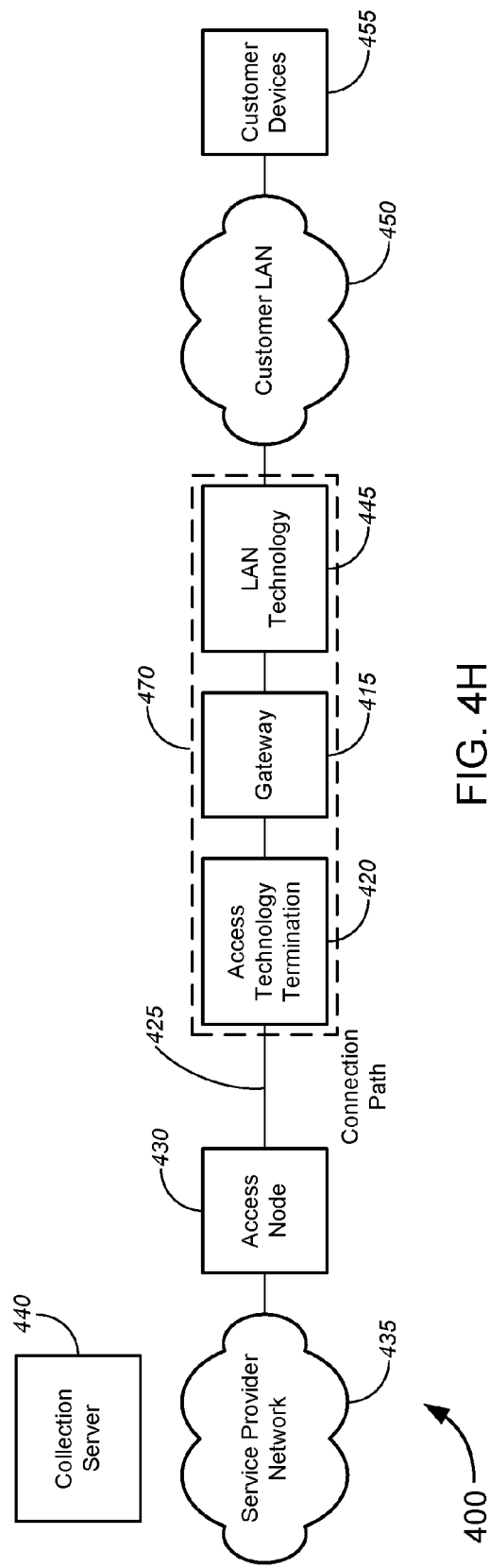

FIG. 4H represents a system 470 that integrates the gateway device 415, the access termination technology 420, and the local area network technology 445. The local performance test device(s) 405 and insert(s) 410 may be located anywhere in networked system 400, including, but not limited to, the locations shown in FIGS. 4A-4E. The local performance test device may also be integrated into the integrated device 470 comprising the gateway device 415, the access termination technology 420, and the local area network technology 445.

The local performance test device 405 and insert 410 may be located anywhere in the service provider network 435 and/or local area network 445. It is not limited to the examples supplied in FIGS. 4A-4H. Further, local performance test device 405 may have the same functionalities as local performance test devices 110, 320, and 330 described in FIGS. 1-3.

Figure 5A:
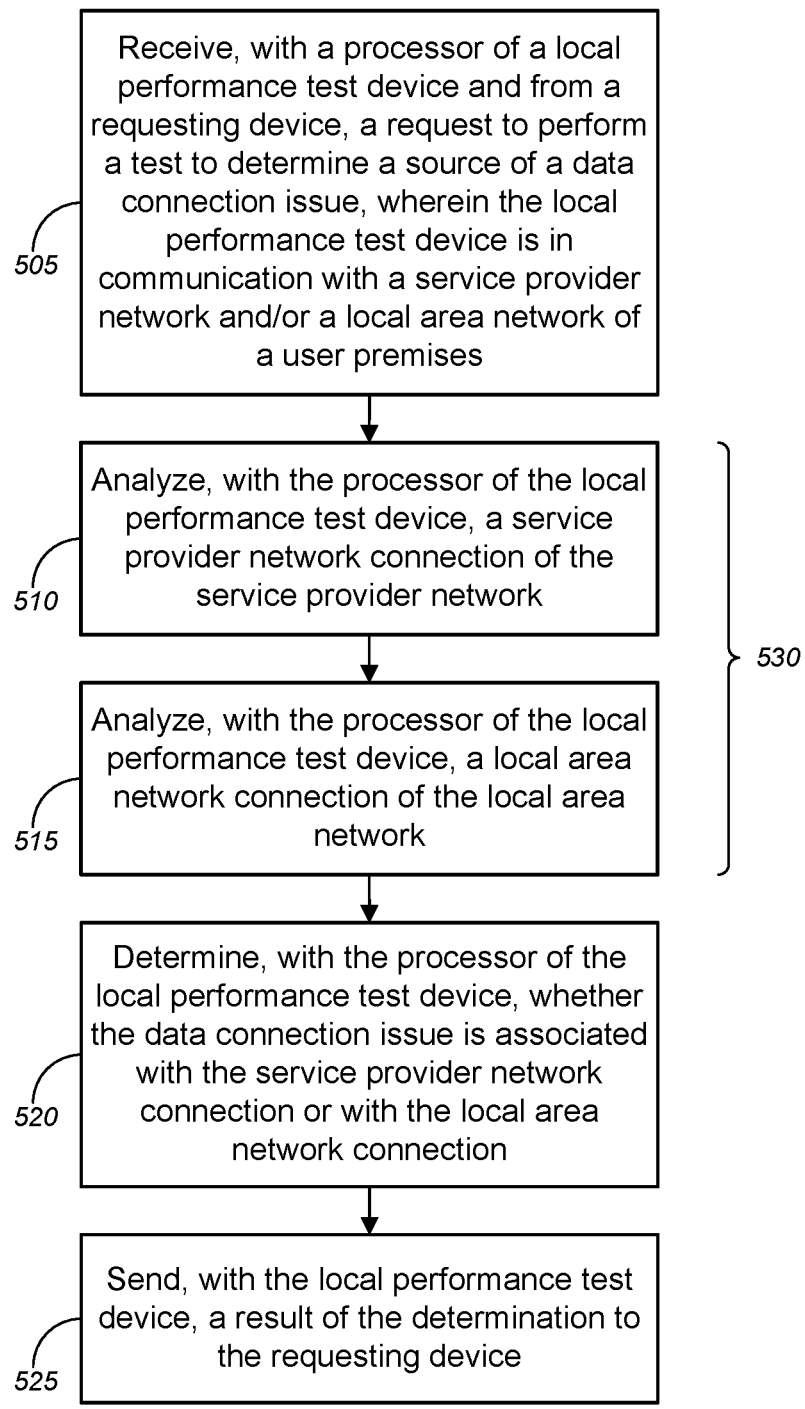

FIGS. 5A-5E (collectively, "FIG. 5") are flow diagrams illustrating a method 500 for implementing local performance testing, in accordance with various embodiments. FIG. 5A depicts the method for implementing a local performance test device, while FIGS. 5B-5E each depict various embodiments for implementing the analysis step of the method of FIG. 5A.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, 300', and 400 of FIGS. 1, 2, 3A, 3B, and 4A-4H respectively (or components thereof), such methods may also be implemented using any suitable hardware (or software) implementation. Similarly, while each of the systems 100, 200, 300, 300', 400 of FIGS. 1, 2, 3A, 3B, and 4A-4H respectively (or components thereof), can operate according to the method 500 illustrated by FIG. 5 (e.g., by executing instructions embodied on a computer readable medium), the systems 100, 200, 300, 300', and 400 of FIGS. 1, 2, 3A, 3B, and 4A-4H respectively, can each also operate according to other modes of operation and/or perform other suitable procedures.

In FIG. 5A, method 500, at block 505, might comprise receiving, with a processor (which might correspond to processor(s) 210 and/or processor(s) 380 of FIGS. 2-3, or the like) of a local performance test device (which might correspond to local performance test device 110, device 310, local performance test device 320, and/or local performance test device 330, test device 405 of FIGS. 1-4, or the like) and from a requesting device (which might correspond to requesting devices 125 or 135 of FIG. 1, or the like), a request to perform a test to determine a source of a data connection, a network connection, and/or a packet based service connection, wherein the local performance test device may be in communication with a service provider network (which might correspond to network(s) 120 and/or 130 or service provider network 435 of FIGS. 1-4, or the like) and/or a local area network (which might correspond to network(s) 120 and/or 130 or customer local area network 450 of FIGS. 1-4, or the like) of a user premises. The local performance test device may be located such that it is able to see network traffic on both a network side and a customer side.

According to some embodiments, the processor might be a processor of the local performance test device. Alternatively, or additionally, the processor might be at least one of a processor corresponding to a local performance test device in communication with an access network and/or local area network.

The local performance test device may be integrated into at least one of a network device comprising at least one of a digital subscriber line modem, a passive optical network optical network terminal, a network node, a network router, a network switch, or a wireless modem. Alternatively, the local performance test device may be a gateway device such as a residential gateway or business gateway.

At block 510, method 500 might comprise analyzing, with the processor of the local performance test device, a service provider network connection of a service provider network.

In order to analyze a service provider network and/or an access network with the local performance test device, the local performance test device may be placed such that it sees traffic on the access network side of the device. The local performance test device may terminate the service provider network and/or an access network. The test function of the local performance test device may also be integrated into a modem (or equivalent device that terminates the network access technology). Additionally, or alternatively, the local performance test device may be placed between cabling of the service provider access network and cabling and/or a port of a network and/or gateway device.

The analysis step may comprise configuring a test measurement function to determine performance parameters of the service provider network (e.g., service provider access network, core network, etc.). These performance parameters may include at least one of bandwidth, packet loss, frame loss, speed of the network traffic, data rate, throughput, jitter, delay, and/or the like of the service provider network.

Alternatively and/or additionally, method 500, at block 515, might comprise analyzing, with the processor of the local performance test device, a local area network connection. In order to analyze a local area network connection with the local performance test device, the local performance test device may be placed such that it sees traffic on the local area network side of a device. The local performance test device may terminate the local area network connection. The test function of the local performance test device may also be integrated into a local area network device that terminates the physical layer of the local area network such as wireless access point. In the case of the wireless access point, the test measurement function may be located between the wide area network side port and the Wi-Fi transceiver. The local performance test device may also be placed between cabling of the local area network connection and cabling and/or a port of a device.

The analysis step may comprise configuring a test measurement function to determine performance parameters of the local area network connection. These performance parameters may include at least one of bandwidth, packet loss, frame loss, speed of the network traffic and/or data stream, data rate, throughput, jitter, delay, and/or the like of the local area network.

Analyzing performance of the access network connection and/or the local area network connection may be performed simultaneously. Alternatively, the access network connection and/or the local area network connection may be tested independently. For example, a requesting device may request that only the access network be tested or that only the local area network be tested.

Next, method 500 may further include, at block 520, determining, with the processor of the local performance test device, whether the data connection issue is associated with the service provider network connection or with the local area network connection, or both. This determination may be made by comparing the determined performance parameters (i.e., bandwidth, packet loss, speed of the network traffic and/or data stream, data rate, jitter, delay, and/or the like) of the service provider network to the determined performance parameters (i.e., bandwidth, packet loss, speed of the network traffic, data rate, jitter, delay, and/or the like) of the local area network.

At block 525, method 500 may further send a result of the determination to the requesting device. The requesting device may be a server on the access network and/or local area network, a database on the access network and/or local area network, a tablet computer, a smart phone, a mobile phone, a personal digital assistant, a desktop computer, a television, a set-top box, a gaming console, a portable gaming device, and/or the like. The requesting device may be associated with a customer, an end-user of a data connection, a network connection, a packet based service, a network provider, a content provider, a service provider, a third-party, and/or the like.

With reference to FIG. 5B, analyzing, with the processor of the local performance test device, a service provider network connection and/or a local area network connection (at block 530, which might correspond to the processes at one or both of blocks 510 and/or 515) might comprise providing at least one local performance test device (which might correspond to local performance test devices 110, 320, and/or 330 of FIGS. 1, 2, 3A and 3B) between cabling of the service provider access network and the network device (e.g., the gateway device) and/or between cabling of the local area network and the network device (e.g., the gateway device) (block 535). In some embodiments, at least two local performance test devices may be used (e.g., a first local performance test device that is associated with the access network and a second local performance test device that is associated with the local area network, or the like). Each local performance test device may be placed such that a network traffic passes through the at least one local performance test device as the network traffic is transmitted from and/or to an access network and/or local area network. Further, each local performance test device may act independently of the other local performance test device.

Each local performance test device may be configured to pass through unaltered network traffic at line-rate when a performance test is not being performed (as shown in FIG. 3A). However, when a performance test is requested, each local performance test device may be configured to re-route unaltered network traffic at line-rate through a test measurement function portion of the at least one local performance test device (as shown in FIG. 3B). Alternatively and/or additionally, instead of re-routing the network traffic, the network traffic may be duplicated instead. The original traffic may continue to flow as if nothing happened. The duplicated network traffic may be sent to the test measurement function of performance test device 320 and/or 330. The duplicated network traffic may then be tested and/or analyzed by the test measurement function and after testing the duplicated network traffic may be discarded.

A test measurement function portion might comprise at least one of a timer, counter, buffer, and/or the like to determine a performance condition of a service provider network (e.g., an access network, a core network, etc.) and/or a local area network.

Method 500 might further comprise providing a timer in communication with the at least one local performance test device (block 540), analyzing, with the timer, network traffic destined for the network device (e.g., the gateway device) based upon receiving the request to perform the test of the data connection (block 545), and establishing a timing baseline (block 550). Alternatively or additionally, the timer and/or clock that is provided may be in communication with a counter of the test measurement function and may establish a timing baseline as the network traffic passes through the counter.

The timer and/or clock may be used to meter the data rate and/or speed, throughput, delay, jitter, and/or the like of the network traffic as it is transmitted toward/away from the access network and/or local area network. The results received from the timer may be stored and/or transmitted to a requesting device.

Alternatively and/or additionally, with reference to FIG. 5C, analyzing, with the processor of the local performance test device, a service provider network connection and/or a local area network connection (at block 530, which might correspond to the processes at one or both of blocks 510 and/or 515) might comprise providing at least one local performance test device between cabling of the service provider access network and the gateway device and/or between cabling of the local area network and the gateway device (block 535) and re-routing, with the at least one local performance test device, network traffic destined for the gateway device through a counter into a buffer (block 555). Network traffic destined for the service provider network and/or local area network may also be re-routed, with the at least one local performance test device, through a counter into a buffer. The at least one local performance test device may re-route unaltered network traffic at line-rate through a test measurement function that may include a counter and/or a buffer.

A counter may be used to provide information as to how well an access network and/or local area network is performing. The counter may be used to count data packets as the packets are passing through the test measurement function of local performance test device. The counter may be used to measure bandwidth (block 560), and in some cases, may be used to measure packet loss, frame loss, and/or the like.

The purpose of the buffer is to allow the network traffic to pass through to the buffer at line-rate. This allows measurement of the bandwidth coming from (and/or traveling to) the network(s) towards (and/or from) the local performance test device to be unimpeded until the buffer is full in order to gain an accurate measurement. The size of the buffer can be selected based on the sample size of the intended test and maximum bandwidth that may be under test. This is particularly true when test network traffic is coming from the Network to the customer. When going from the customer to the Network, the buffer is an indication of whether test network traffic from the customer side to the Network is arriving at a rate faster than the connection to the network. To measure the fastest speed of traffic going to the network, the customer side will need to generate test network traffic faster than the network connection can transmit the test network traffic to get an accurate result.

After passing through the test measurement function of the at least one local performance test device, method 500, at block 565, may route, with the at least one local performance test device, unaltered network traffic back to the gateway once the network traffic has passed through the counter into the buffer. Alternatively, after passing through the test measurement function of the at least one local performance test device, method 500 may route, with the at least one local performance test device, unaltered network traffic back to the access network and/or the local area network once the network traffic has passed through the counter into the buffer. This network traffic may be unaltered and transmitted at line-rate such that an end-user does not notice any interruptions, delays, and/or inconsistencies in his or her network or data service because of the performance test.

Alternatively or additionally, with reference to FIG. 5D, analyzing, with the processor of the local performance test device, a service provider network connection and/or a local area network connection (at block 530, which might correspond to the processes at one or both of blocks 510 and/or 515) might comprise providing at least one local performance test device between cabling of the service provider access network and the gateway device and/or between cabling of the local area network and the gateway device (block 535) and causing, with the processor, the at least one local performance test device to generate test network traffic toward the service provider network and/or local area network (block 570).

Before generating test network traffic, the processor may determine information about the network and a subscriber's service, such as the customer's and/or subscriber's contract. Based on the determination about the line and/or contract, the processor may generate a network traffic that is suitable to test an access network and/or a local area network.

Once suitable test network traffic is determined, the processor may check to determine that there is no existing traffic on an access network and/or local area network that might interfere with the test measurement function. In other words, the processor may check that an end-user is not already sending or receiving traffic on an access network and/or a local area network.

Once the processor determines suitable test network traffic to send and determines that there is no existing traffic on network, the method 500 at block 575 may measure, with the counter, the bandwidth of the test network traffic coming from the gateway device towards the service provider network and/or local area network. In order to measure the bandwidth, the at least one local performance test device may re-route the unaltered test network traffic at line-rate through a counter into a buffer. The counter may also be used to measure packet loss and/or frame loss on an access network and/or local area network.

Instead of re-routing the network traffic, the network traffic may be duplicated by the processor of the local performance test device(s) 320 and/or 330. The original traffic may continue to flow as if nothing happened. The duplicated network traffic may be sent, by the processor, to the test measurement function of performance test device 320 and/or 330. The duplicated network traffic may then be tested and/or analyzed by the test measurement function and after testing the duplicated network traffic may be discarded.

Further, a timer may be in communication with the counter to establish a timing baseline and/or determine data rate, data speed, throughput, delay, jitter, and/or the like of the network traffic.

Once the test network traffic is measured, method 500 may further comprise sending a result of the measured bandwidth to the requesting user device (block 580). The result may also include a result of measured packet loss, metered data rate, data speed, throughput, delay, jitter, and/or the like.

Alternatively or additionally, with reference to FIG. 5E, analyzing, with the processor of the local performance test device, a service provider network connection and/or a local area network connection (at block 530, which might correspond to the processes at one or both of blocks 510 and/or 515) might comprise providing at least one local performance test device between cabling of the service provider access network and the gateway device and/or between cabling of the local area network and the gateway device (block 535), and receiving, with the at least one local performance test device, a test network traffic from the service provider network and/or local area network (block 585).

This network traffic may be provided by a device (such as a server and/or the like) located on network(s) 120 and/or network(s) 130. Before sending the test network traffic, the device(s) on the service provider network and/or local area network may determine information about the network and a subscriber's service, such as the customer's and/or subscriber's contract and/or line. Based on the determination about the contract and/or line, the device on the service provider network and/or local area network may generate network traffic that is suitable to test the service provider network and/or local area network.

Once suitable test network traffic is determined, the device on the service provider network and/or local area network may check to determine that there is no existing traffic on the service provider network and/or local area network that might interfere with the test measurement function. In other words, the device on the service provider network and/or local area network may check that an end-user is not already sending traffic on the service provider network and/or local area network. Once the device on the service provider network and/or local area network determines suitable test network traffic to send and that there is no existing traffic on the service provider network and/or local area network, the network device may then send the test network traffic and the at least one local performance test device may be used to test the generated test network traffic.

Alternatively, test network traffic may be generated by attempting to download, with the processor, a stream of network traffic from a known source with known bandwidth capability that is greater than the subscribed-to access bandwidth service. In a non-limiting example, a server on the network may generate a test network traffic stream at a data rate faster than the bandwidth capability of the subscribed-to access service. By generating a test network traffic stream at a data rate faster than the bandwidth capability of the subscribed-to access service, the counter, buffer, and/or timer may more accurately measure and/or test the generated network traffic stream.

Once the device on the access network and/or local area network determines suitable test network traffic to send and that there is no existing traffic on network, the method 500, at block 590, may measure, with the counter, the bandwidth of the test network traffic coming from the service provider network and/or local area network toward the at least one local performance test device. In order to measure the bandwidth, the at least one local performance test device may re-route the unaltered test network traffic at line-rate through a counter into a buffer. The counter may also be used to measure packet loss and/or frame loss on an access network and/or local area network.

Further, a timer may be in communication with the counter to establish a timing baseline and/or determine data rate, data speed, throughput delay, jitter, and/or the like of the network traffic.

Once the test network traffic is measured, method 500 may further comprise sending a result of the measured bandwidth to the requesting user device (block 595). The result may also include a result of measured bandwidth, packet loss, frame loss, metered data rate, data speed, throughput, delay, jitter, and/or the like.

Exemplary System and Hardware Implementation

Figure 6:
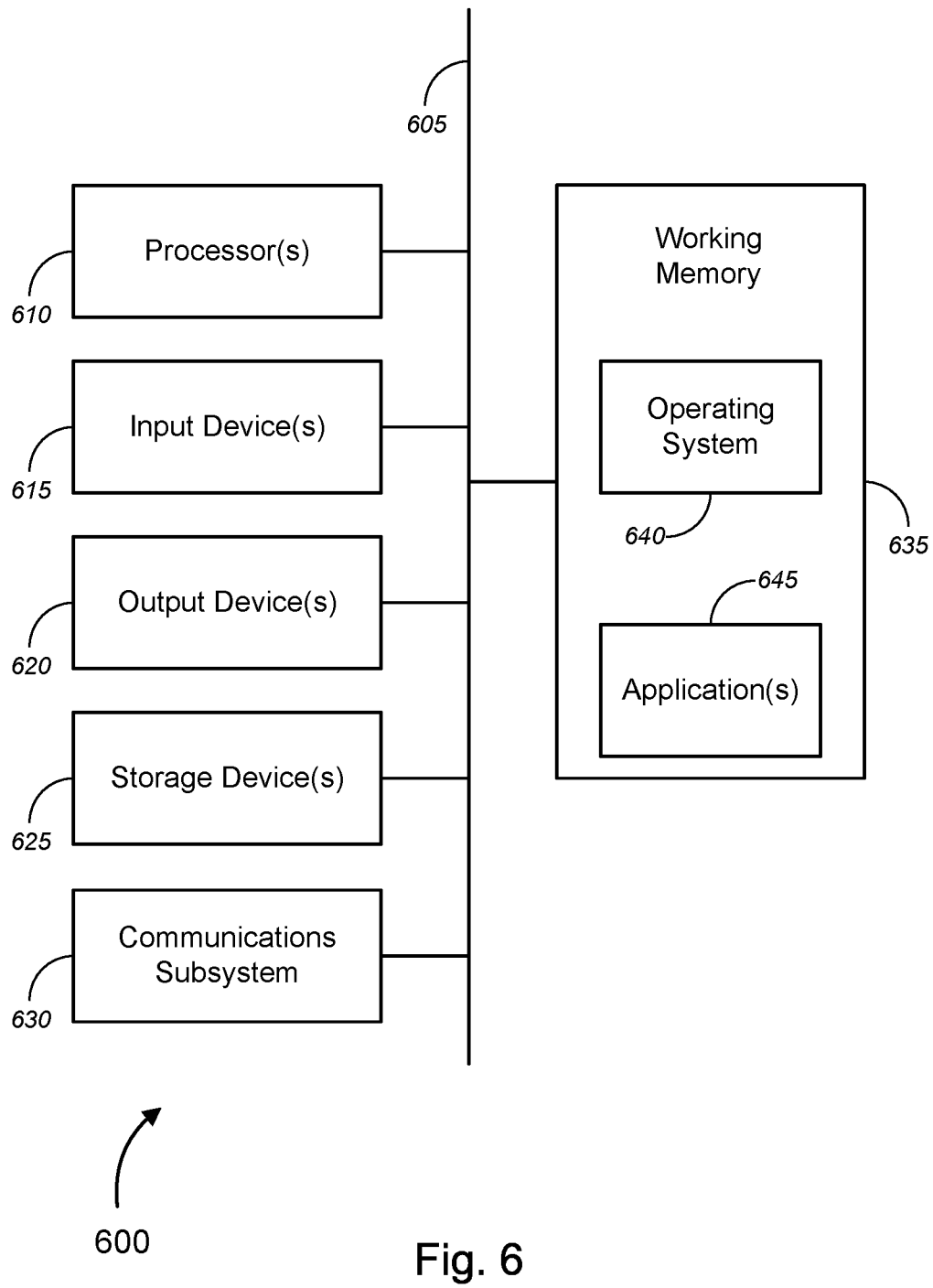
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., local performance test device 110, device 310, local performance test device 320, local performance test device 330, local performance test device 405, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., local performance test device 110, device 310, local performance test devices 320, local performance test device 330, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a Wi-Fi device, a WiMAX device, a WWAN device, a Z-Wave device, a ZigBee device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage devices 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
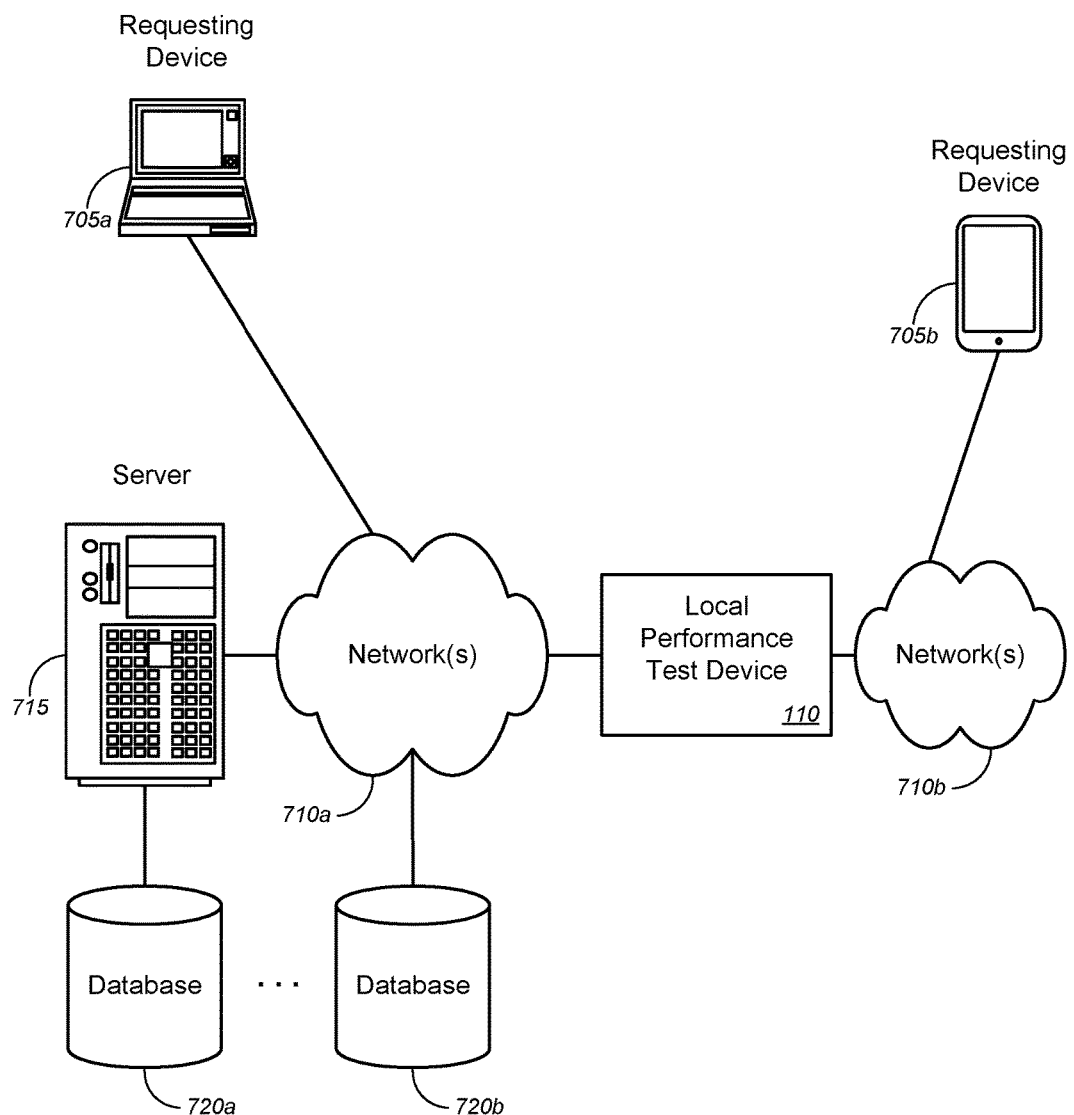
FIG. 7 is a block diagram illustrating an example of a networked system of computers, computing systems, or system hardware architecture, which can be used in accordance with various embodiments.

As noted above, a set of embodiments comprises methods and systems for testing a service provider network and/or a local area network, and, in particular embodiments, to methods, systems, apparatus, and computer software for allowing a user, customer, network provider, content provider, and/or service provider to test the service provider network and/or the local area network to determine whether a performance issue is occurring in the service provider network and/or the local area network. FIG. 7 illustrates a schematic diagram of a system 700 that can be used in accordance with various embodiments of the local performance test device 110. The system 700 may include local performance test device 110 is accordance with the embodiments described in FIGS. 1-6. Local performance test device may be communicatively coupled to network(s) 710*a* and/or 710*b*.

The system 700 can include one or more requesting devices such as service provider/user computers, service provider/user devices, or service provider/customer devices 705. These service provider/user computers, service provider/user devices, or service provider/customer devices 705 may be owned by a network provider and/or by a customer. A service provider/user computer, service provider/user device, or service provider/customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A service provider/user computer, service provider/user device, or service provider/customer device 705 can also have any of a variety of applications, including one or more applications configured to perform methods provided by various embodiments (as described above, for example), as well as one or more office applications, database client and/or server applications, and/or web browser applications. Alternatively, a service provider/user computer, service provider/user device, or service provider/customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two service provider/user computers, service provider/user devices, or service provider/customer devices 705, any number of service provider/user computers, service provider/user devices, or service provider/customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to networks 120 and 130 of FIGS. 1-3, or the like) can each include a local area network ("LAN") and/or an access network, including, without limitation, a fiber network, an Ethernet network, a Token-Ring™ network, and/or the like; a wide-area network ("WAN"); a wireless wide area network ("WWAN"); a fixed wireless network; a mobile wireless network; a passive optical network ("PON"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from service provider/user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the service provider/user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705, local performance test device 110 (shown in FIGS. 1 and 2), local performance test device 320 (shown in FIG. 3), local performance test device 330 (shown in FIG. 3), local performance test device 405 (shown in FIG. 4), and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a service provider/user computer, service provider/user device, or service provider/customer device 705 and/or another server 715. In some embodiments, an application server can store one or more results obtained from testing the performance of a service provider network and/or a local area network, as described in detail above. Data provided by an application server may be formatted as one or more web pages (comprising HTML, JavaScript, etc., for example) and/or may be forwarded to a service provider/user computer 705 via a web server (as described above, for example). Similarly, a web server might receive web page requests and/or input data from a service provider/user computer 705, local performance test device 110, local performance test device 320 (shown in FIG. 3), local performance test device 330 (shown in FIG. 3), and/or the like and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a service provider/user computer 705, another server 715, local performance test device 110 (shown in FIGS. 1 and 2), local performance test device 320 (shown in FIG. 3), local performance test device 330 (shown in FIG. 3), local performance test device 405 (shown in FIG. 4), and/or the like. Alternatively, as those skilled in the art will appreciate, a file server can include all necessary files, allowing such an application to be invoked remotely by a service provider/user computer, service provider/user device, or service provider/customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a and 720b (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for testing a data connection, the method comprising:
providing, a local performance test device with a first test measurement function and a second test measurement function, wherein the first test measurement function is located between cabling for a service provider network and cabling for a gateway device and terminates a physical layer of the service provider network, and wherein the second test measurement function is located between cabling for a local area network and cabling for the gateway device and terminates a physical layer of the local area network;
receiving, with a processor of the local performance test device and from a requesting device, a request to perform a test to determine a source of a data connection issue, wherein the local performance test device is in communication with the service provider network and the local area network of a user premises;
analyzing, with a processor of the first test measurement function of the of the local performance test device, a service provider network connection of the service provider network;
analyzing, with a processor of the second test measurement function of the of the local performance test device, a local area network connection of the local area network;
determining, with the processor of the local performance test device, whether the data connection issue is associated with the service provider network connection or with the local area network connection; and
sending, with the local performance test device, a result of the determination to the requesting device.

2. The method of claim 1, wherein the local performance test device is integrated into a network device comprising at least one of a digital subscriber line modem, a passive optical network optical network terminal, a network node, a network router, a network switch, or a wireless modem.

3. The method of claim 1, wherein the local performance test device is the gateway device.

4. The method of claim 3, wherein the service provider network comprises an Ethernet network, and wherein the local area network comprises an Ethernet network.

5. The method of claim 1, further comprising:
providing a timer in communication with the local performance test device;
analyzing, with the timer, network traffic destined for the gateway device based upon receiving the request to perform the test of the data connection; and
establishing a timing baseline.

6. The method of claim 1, further comprising:
re-routing, with the local performance test device, network traffic destined for at least one of a digital subscriber line modem, a passive optical network optical network terminal, a wireless modem, or the gateway device through a counter into a buffer;
measuring, with the counter, a bandwidth; and
routing, with the at least one insert, unaltered network traffic back to the at least one of a digital subscriber line modem, a passive optical network optical network terminal, a wireless modem, or the gateway device once the network traffic has passed through the counter into the buffer.

7. The method of claim 6, further comprising:
causing, with the processor, the local performance test device to generate network traffic toward the service provider network;
measuring, with the counter, a bandwidth coming from the gateway device towards the service provider network; and
sending a result of the measured bandwidth to the requesting user device.

8. The method of claim 6, further comprising:
receiving, with the counter, test network traffic from the service provider network;

measuring with the counter, a bandwidth coming from the service provider network towards the gateway device; and sending a result of the measured bandwidth to the requesting user device.

9. The method of claim 1, further comprising:

providing a timer in communication with the local performance test device;

analyzing, with the timer, network traffic destined for the gateway device based upon receiving the request to perform the test of the data connection; and establishing a timing baseline.

10. The method of claim 1, further comprising:

re-routing, with the local performance test device, network traffic destined for a digital subscriber line modem, a passive optical network optical network terminal, a wireless modem, or the gateway device through a counter into a buffer;

measuring, with the counter, a bandwidth; and routing, with the at least one insert, unaltered network traffic back to the at least one of a digital subscriber line modem, a passive optical network optical network terminal, a wireless modem, or the gateway device once the network traffic has passed through the counter into the buffer.

11. The method of claim 10, further comprising:

causing, with the processor, the local performance test device to generate a network traffic toward the local area network; and measuring, with the counter, a bandwidth coming from the gateway device towards the local area network; and sending a result of the measured bandwidth to the requesting user device.

12. The method of claim 10, further comprising:

receiving, with the counter, test network traffic from the local area network;

measuring with the counter, a bandwidth coming from the local area network towards the gateway device; and sending a result of the measured bandwidth to the requesting user device.

13. The method of claim 1, wherein the request to perform a test to determine the source of the data connection issue is received from at least one of a service provider or a customer.

14. The method of claim 1, wherein the processor of the performance test device analyzes individual traffic flows to determine where a performance issue is occurring.

15. A system for testing a data connection, the system comprising:

a local performance test device in communication with a service provider network and a local area network, the local performance test device comprising:

a first test measurement function, wherein the first test measurement function is located between cabling for the service provider network and cabling for a gateway device and terminates a physical layer of the service provider network;

a second test measurement function, wherein the second test measurement function is located between cabling for the local area network and cabling for the gateway device and terminates a physical layer of the local area network;

at least one first processor; and a first non-transitory computer readable medium communicatively coupled to the at least one first processor, the first non-transitory computer readable medium having stored thereon computer software comprising a first set of instructions that, when executed by the at least one first processor, causes the local performance test device to:

receive, from a requesting device, a request to perform a test to determine a source of a data connection issue, wherein the local performance test device is in communication with the service provider network and the local area network of a user premises;

analyze, with the first test measurement function, a service provider network connection of the service provider network;

analyze, with the second test measurement function, a local area network connection of the local area network;

determine whether the data connection issue is associated with the service provider network connection or with the local area network connection; and send a result of the determination to the requesting device.

16. The system of claim 15, wherein the local performance test device is the gateway device.

17. The system of claim 15, wherein the service provider network comprises an Ethernet network, and wherein the local area network comprises an Ethernet network.

18. An apparatus for testing a data connection, the apparatus comprising:

a first test measurement function, wherein the first test measurement function is located between cabling for a service provider network and cabling for a gateway device and terminates a physical layer of the service provider network;

a second test measurement function, wherein the second test measurement function is located between cabling for a local area network and cabling for the gateway device and terminates a physical layer of the local area network;

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, from a requesting device, a request to perform a test to determine a source of a data connection issue, wherein the local performance test device is in communication with the service provider network and the local area network of a user premises;

analyze, with the first test measurement function, the service provider network connection of the service provider network;

analyze, with the second test measurement function, the local area network connection of the local area network;

determine whether the data connection issue is associated with the service provider network connection or with the local area network connection; and send a result of the determination to the requesting device.

* * * * *